US010015067B2

(12) United States Patent
Khan et al.

(10) Patent No.: US 10,015,067 B2
(45) Date of Patent: Jul. 3, 2018

(54) AUTOMATICALLY VERIFYING LOGIC OF PROTOCOL MESSAGES EXCHANGED BETWEEN DEVICES DURING A COMMUNICATION SESSION

(71) Applicant: Verizon Patent and Licensing Inc., Arlington, VA (US)

(72) Inventors: Kashif Khan, Keller, TX (US); Matt J. Warner, Justin, TX (US); Janet M. Triplett, Dallas, TX (US); Linda M. Sikora, Keller, TX (US); Pamela Aldridge, Fort Worth, TX (US); Christopher Moore, Roanoke, TX (US); Shafaq Zia, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 40 days.

(21) Appl. No.: 15/241,847

(22) Filed: Aug. 19, 2016

(65) Prior Publication Data

US 2018/0054370 A1    Feb. 22, 2018

(51) Int. Cl.
| G01R 31/08 | (2006.01) |
| G06F 11/00 | (2006.01) |
| G08C 15/00 | (2006.01) |
| H04J 1/16 | (2006.01) |
| H04L 1/00 | (2006.01) |

(Continued)

(52) U.S. Cl.
CPC ........ *H04L 43/0847* (2013.01); *H04L 43/045* (2013.01); *H04L 43/06* (2013.01); *H04L 43/18* (2013.01); *H04L 65/1006* (2013.01)

(58) Field of Classification Search
CPC ... H04L 43/0847; H04L 43/045; H04L 43/06; H04L 43/18; H04L 65/1006
See application file for complete search history.

(56) References Cited

U.S. PATENT DOCUMENTS 5,850,386 A * 12/1998 Anderson ............... H04L 43/18
                                                        370/241
6,931,574 B1 * 8/2005 Coupal ................... H04L 43/18
                                                        709/230

(Continued)

OTHER PUBLICATIONS

Wikipedia, "Session Initiation Protocol," https://en.wikipedia.org/wiki/Session_Initiation_Protocol#SIP_messages, Aug. 18, 2016, 8 pages.

(Continued)

*Primary Examiner* — Steve D Agosta

(57) ABSTRACT

A device may receive a file that includes a log of messages for messages communicated among multiple devices during a communication session. The device may analyze the file to determine information associated with the messages. The device may identify a request message from a first device of the multiple devices to a second device of the multiple devices using the information determined from the file. The device may determine whether the second device transmitted a response message based on receiving the request message from the first device. The device may determine whether the response message corresponds to the request message. The device may determine whether the response message is associated with a pass status or a fail status. The device may perform an action based on whether the response message is associated with the pass status or the fail status.

20 Claims, 20 Drawing Sheets

(51) Int. Cl.
*H04L 12/26* (2006.01)
*H04L 29/06* (2006.01)

(56) References Cited

U.S. PATENT DOCUMENTS

| | | | | |
|---|---|---|---|---|
| 7,027,437 B1* | 4/2006 | Merchant | ................ | H04L 43/12 |
| | | | | 370/389 |
| 2015/0039775 A1* | 2/2015 | Benner | ............... | H04L 65/1006 |
| | | | | 709/228 |
| 2015/0350047 A1* | 12/2015 | Bird | ........................ | H04L 67/42 |
| | | | | 709/224 |
| 2017/0322858 A1* | 11/2017 | Webster | ................ | G06F 11/322 |

OTHER PUBLICATIONS

Wikipedia, "Wireshark," https://en.wikipedia.org/wiki/Wireshark, Aug. 4, 2016, 5 pages.

* cited by examiner

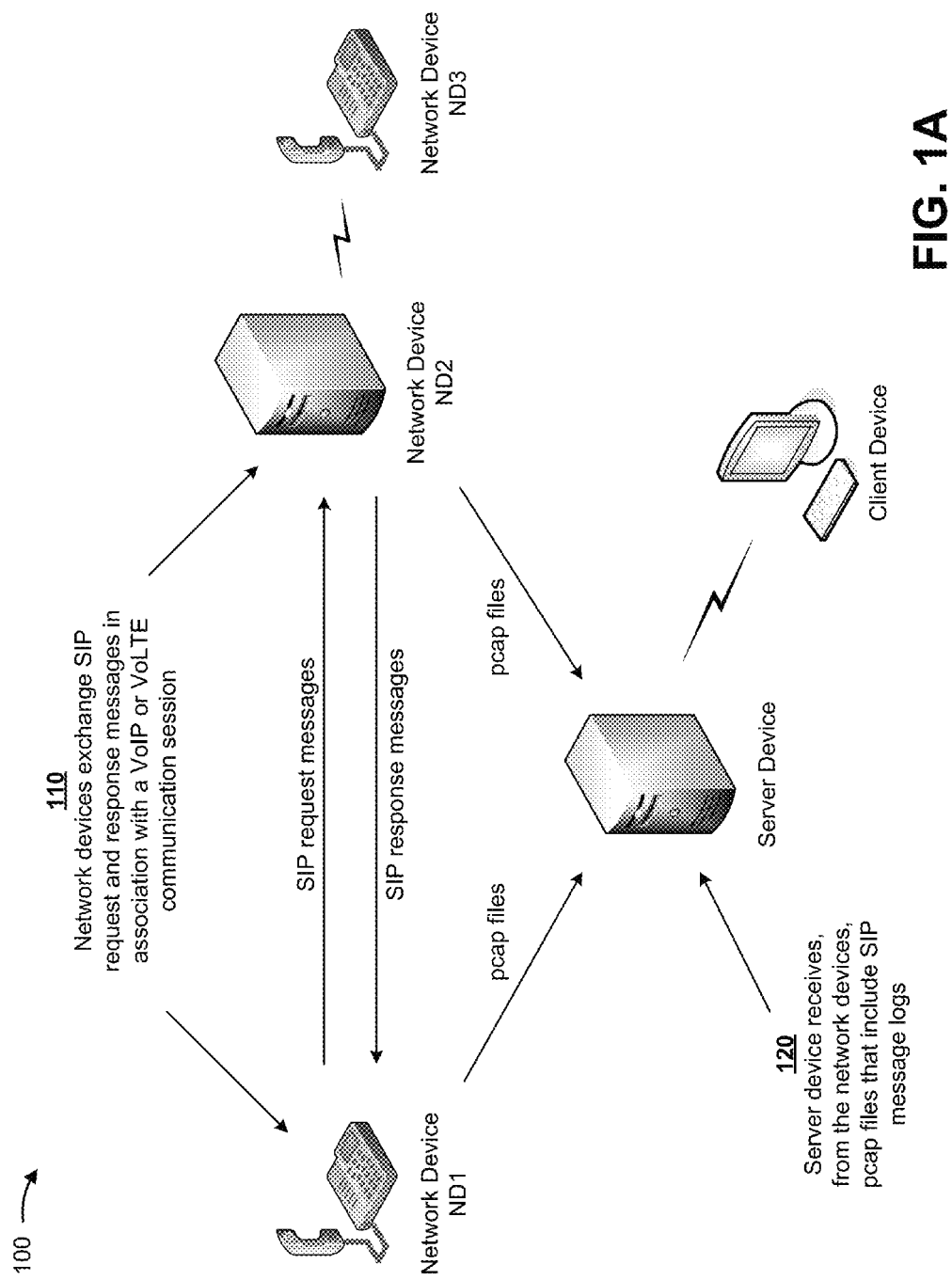

US 10,015,067 B2

AUTOMATICALLY VERIFYING LOGIC OF PROTOCOL MESSAGES EXCHANGED BETWEEN DEVICES DURING A COMMUNICATION SESSION

BACKGROUND

The Session Initiation Protocol (SIP) is a communications protocol for signaling and controlling multimedia communications sessions. SIP may be used in Internet telephony for voice and video calls, as well as for instant messaging, over Internet Protocol (IP) networks. SIP defines the messages that are sent between communication endpoints. The messages govern establishment, termination, and other elements of a call.

BRIEF DESCRIPTION OF THE DRAWINGS

FIGS. 1A-1D are diagrams of an overview of an example implementation described herein;

DETAILED DESCRIPTION OF PREFERRED EMBODIMENTS

The following detailed description of example implementations refers to the accompanying drawings. The same reference numbers in different drawings may identify the same or similar elements.

A communication session between two or more network devices may include a large quantity of request messages and response messages. The request messages and the response messages may utilize a particular request-response protocol. A network administrator may wish to verify the logic of the request-response protocol used during the communication session. For example, the network administrator may wish to verify that a SIP request message has a corresponding SIP response message. The network administrator may verify the logic of the request-response protocol by examining the request messages sent from a network device and additionally by examining the response messages received by the network device. However, examining the request messages and/or the response messages may not enable the network administrator to trace the request messages and/or the response messages through a network, to determine a potential source of failure for unreceived request messages and/or unreceived response messages, for example. Additionally, the network administrator may have to manually examine logs of request messages and/or response messages in an attempt to trace the messages. Manual examination of logs of request messages and/or response messages may consume significant resources and/or may be labor intensive.

Implementations described herein automatically verify the logic of a request-response protocol, and obtain a network-wide view of request messages and response messages exchanged between network devices during a communication session. Implementations described herein also automatically perform an action based on a result of verifying the logic of the request-response protocol. In this way, processing resources may be conserved, labor associated with manually verifying the request-response protocol may be reduced, and an efficiency of correcting potential errors in the request-response protocol may be increased by enabling the network administrator to quickly identify failed request messages and/or response messages exchanged between network devices and to quickly identify a source of the failed request messages and/or response messages.

Figure 1B:
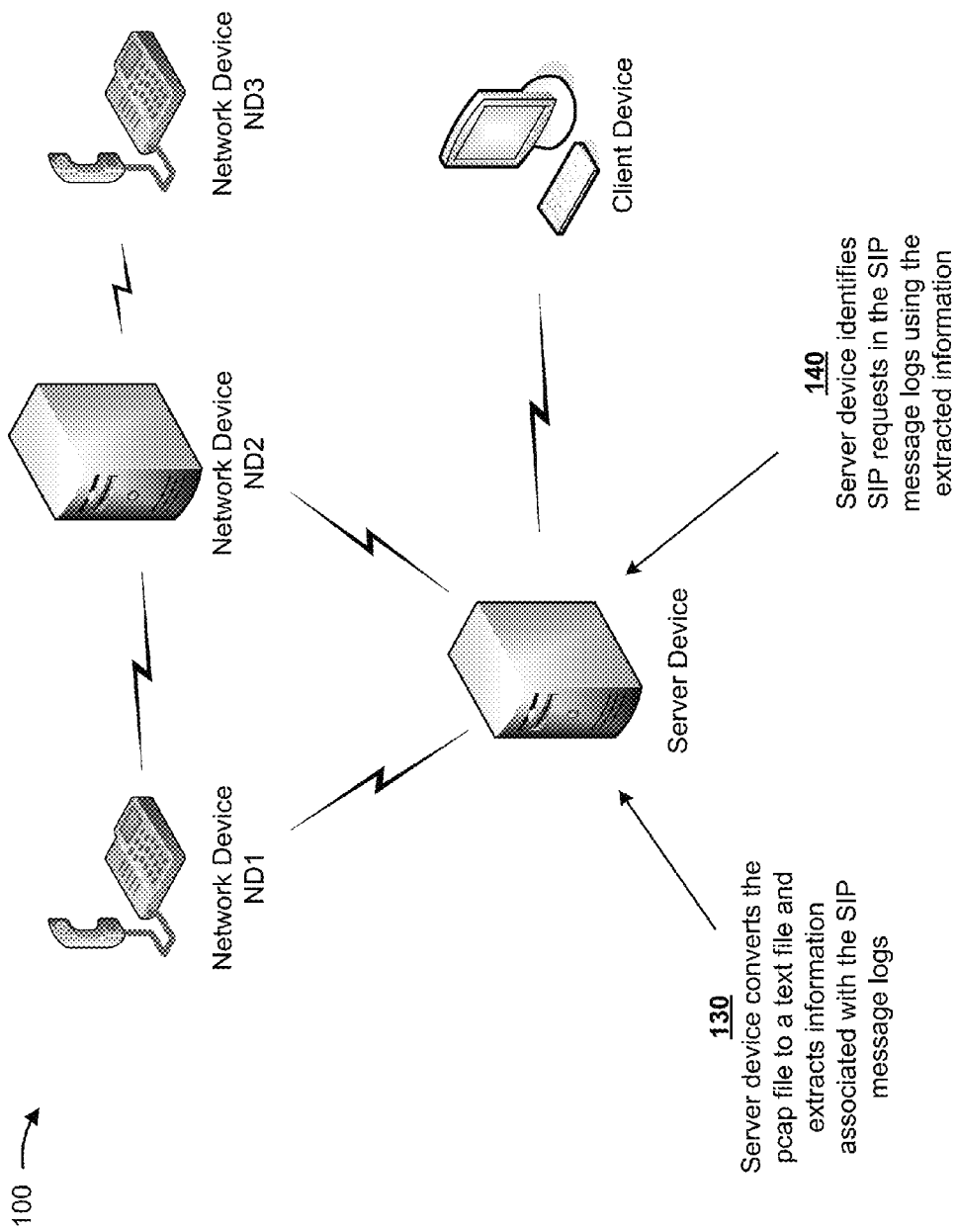

FIGS. 1A-1D are diagrams of an overview of an example implementation 100 described herein. As shown by FIG. 1A, and by reference number 110, network devices may exchange SIP request messages and SIP response messages in association with a Voice over Internet Protocol (VoIP) or Voice over Long Term Evolution (VoLTE) communication session. For example, network device ND1 may transmit SIP request messages to network device ND2, and network device ND2 may transmit SIP response messages to network device ND1, or vice versa.

As shown by reference number 120, a server device may receive, from the network devices, one or more packet capture (pcap) files or a similar type of file (e.g., similar to pcap files) that can store SIP messages and/or information associated with SIP messages. For example, the server device may receive pcap files, or similar types of files, from network device ND1 and network device ND2. The pcap files, or similar types of files, received from network device ND1 and network device ND2 may include SIP message logs.

In example implementation 100, and as shown by FIG. 1B, the server device may process the pcap files, or similar types of files, to enable the server device or another device to extract information from the pcap files, or similar types of files. For example, and as shown by reference number 130, the server device may convert the pcap files, or similar types of files, to text files and may extract information associated with the SIP message logs. As shown by reference number 140, the server device may identify SIP request messages in the SIP message logs using the extracted information.

Figure 1C:
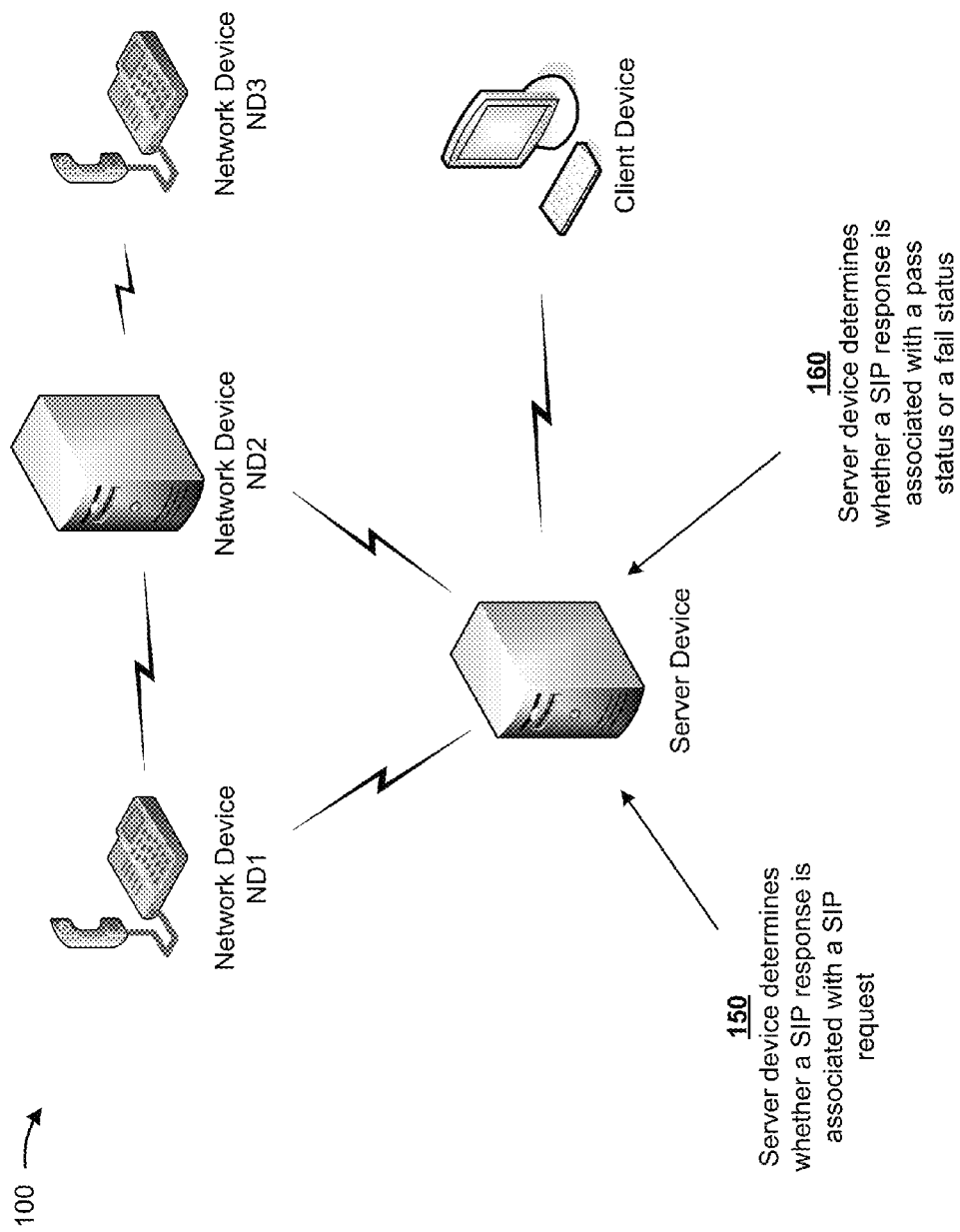

In example implementation 100, and as shown by FIG. 1C, the server device may determine whether a response message transmitted by a network device is associated with a request message transmitted by another network device. For example, and as shown by reference number 150, the server device may determine whether a SIP response message (e.g., transmitted by network device ND2) is associated with a SIP request message (e.g., transmitted by network device ND1). As further shown by FIG. 1C, the server device may determine whether the response message is associated with a status. For example, as shown by reference number 160, the server device may determine whether a SIP response message is associated with a pass status or a fail status.

Figure 1D:
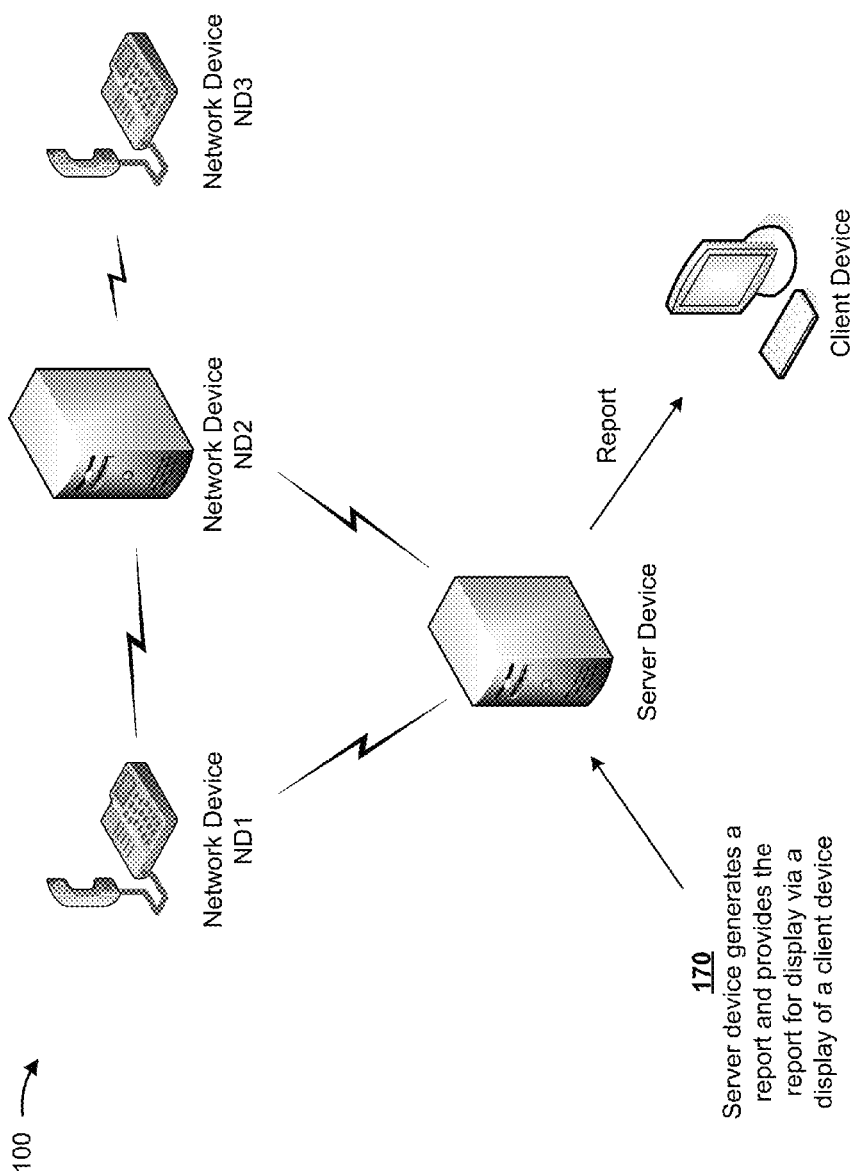

In example implementation 100, and as shown by FIG. 1D, the server device may generate a report that includes information identifying a result of determining whether the response message is associated with the request message and/or a result of determining whether the response message is associated with the pass status or the fail status. For example, and as shown by reference number 170, the server device may generate a report and may provide the report for display via a display of a client device.

In this way, the server device may automatically verify the logic of the request-response protocol used by the network devices and may obtain a network-wide view of request messages and response messages exchanged between network devices during a communication session. By automatically verifying the logic of the request-response protocol used by the network devices, and by obtaining a network-wide view of request messages and response messages exchanged between the network devices during a communication session, processing resources may be conserved, labor associated with manually verifying the request-response protocol may be reduced, and an efficiency of correcting potential errors in the request-response protocol may be increased by facilitating the identification of failed request messages and/or response messages exchanged between network devices and identification of a source of the failed request messages and/or response messages.

As indicated above, FIGS. 1A-1D are provided merely as an example. Other examples are possible and may differ from what was described with regard to FIGS. 1A-1D.

Figure 2:
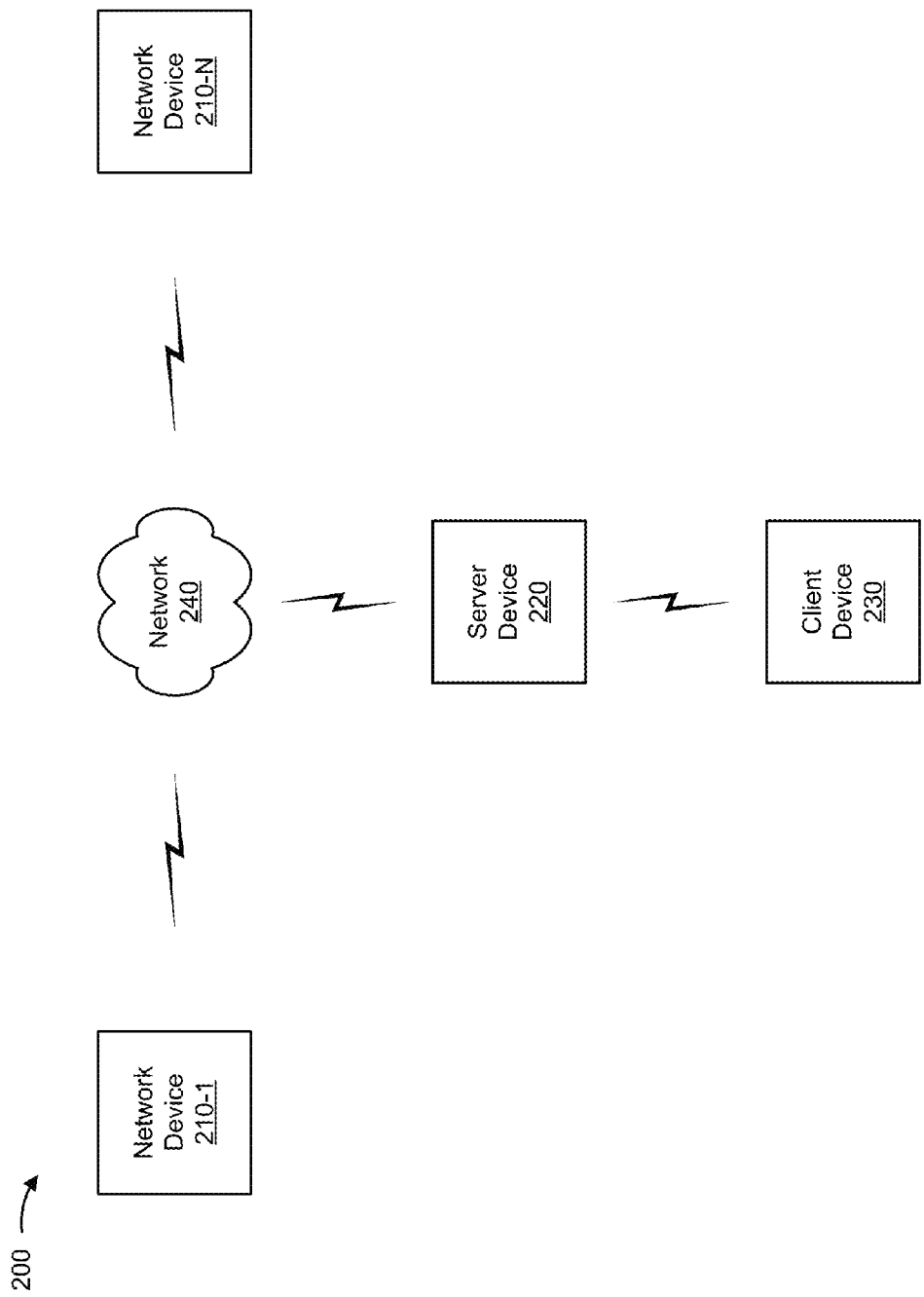
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-N (N≥1) (hereinafter referred to collectively as "network devices 210," and individually as "network device 210"), server device 220, client device 230, and network 240. Devices of environment 200 may interconnect via wired connections, wireless connections, or a combination of wired and wireless connections.

Network device 210 includes one or more devices capable of receiving, providing, storing, generating, and/or processing messages associated with a protocol. For example, network device 210 may include a firewall, a router, a gateway, a switch, a hub, a bridge, a reverse proxy, a server (e.g., a proxy server, a web server, a host server, a storage server, or a server in a data center or a cloud computing environment), a security device, an intrusion detection device, a load balancer, or a similar type of device. As another example, network device 210 may include a communication and/or computing device, such as a mobile phone (e.g., smartphone or a radio telephone), a telephone (e.g., a desk telephone or an IP telephone), a laptop computer, a tablet computer, a gaming device, a wearable communication device (e.g., a smart wristwatch, an activity band, or a pair of smart eyeglasses), or a similar type of device. In some implementations, network device 210 may transmit a request message associated with a protocol to another network device 210, as described elsewhere herein. Additionally, or alternatively, network device 210 may receive a response message associated with the protocol from the other network device 210, as described elsewhere herein.

Server device 220 includes one or more devices capable of receiving, providing, storing, generating, and/or processing information associated with request messages and/or response messages during a communication session involving network devices 210. For example, server device 220 may include a server (e.g., in a data center or a cloud computing environment), a data center (e.g., a multi-server micro data center), a workstation computer, a virtual machine (VM) provided in a cloud computing environment, or a similar type of device. In some implementations, server device 220 may receive information associated with request messages and/or response messages transmitted between network devices 210, as described elsewhere herein. Additionally, or alternatively, server device 220 may verify the logic of the request messages and/or the response messages between network devices 210, as described elsewhere herein.

Client device 230 includes one or more devices capable of receiving, providing, storing, generating, and/or processing information associated with request messages and/or response messages between network devices 210. For example, client device 230 may include a communication and/or computing device, such as a mobile phone (e.g., a smart phone or a radiotelephone), a laptop computer, a tablet computer, a desktop computer, a gaming device, a wearable communication device (e.g., a smart wristwatch, an activity band, or a pair of smart eyeglasses), or a similar type of device. In some implementations, client device 230 may receive, from server device 220, information associated with verifying the logic of the request messages and/or the response messages, as described elsewhere herein. Additionally, or alternatively, client device 230 may provide the information received from server device 220 for display via a display of client device 230, as described elsewhere herein.

Network 240 includes one or more wired and/or wireless networks. For example, network 240 may include a cellular network (e.g., a long-term evolution (LTE) network, a 3G network, or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
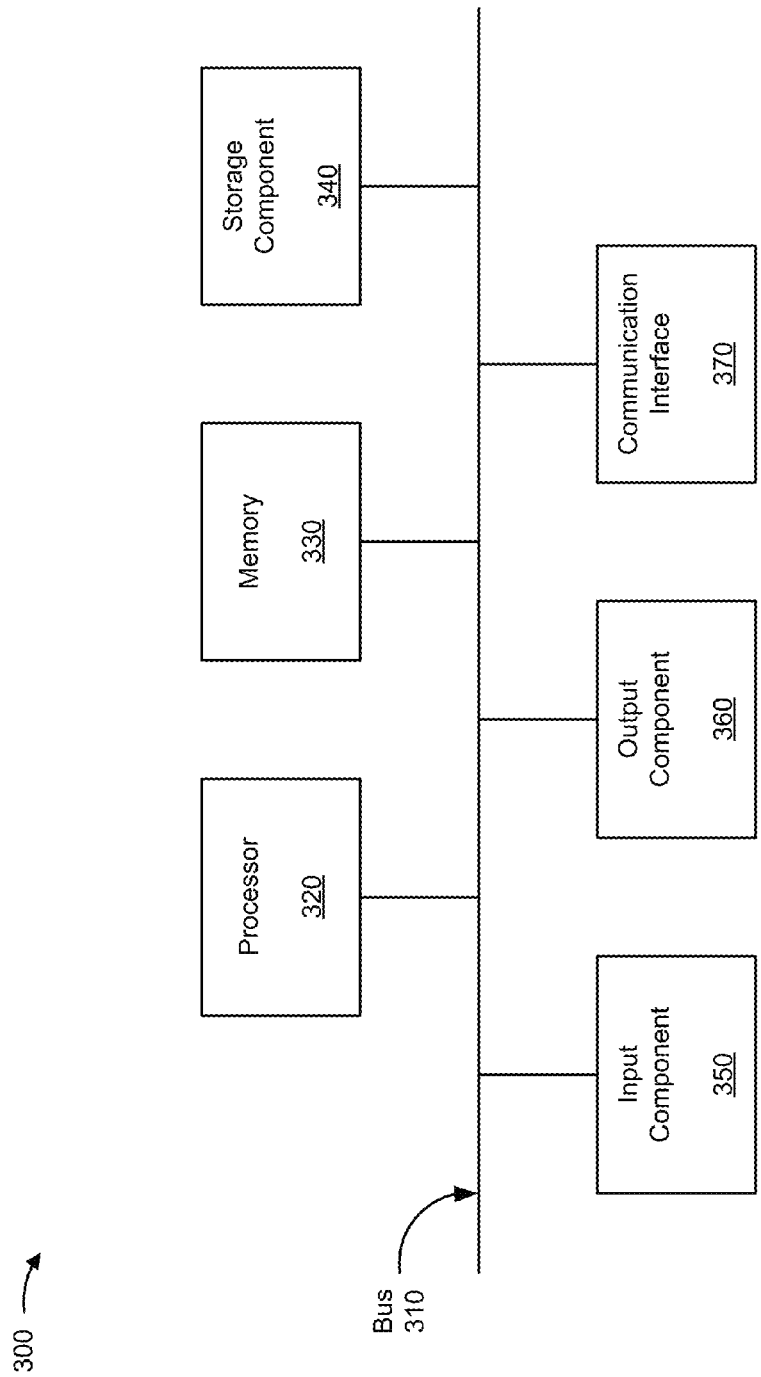
FIG. 3 is a diagram of example components of one or more devices of FIG. 2.

FIG. 3 is a diagram of example components of a device 300. Device 300 may correspond to network device 210, server device 220, and/or client device 230. In some implementations, network device 210, server device 220, and/or client device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
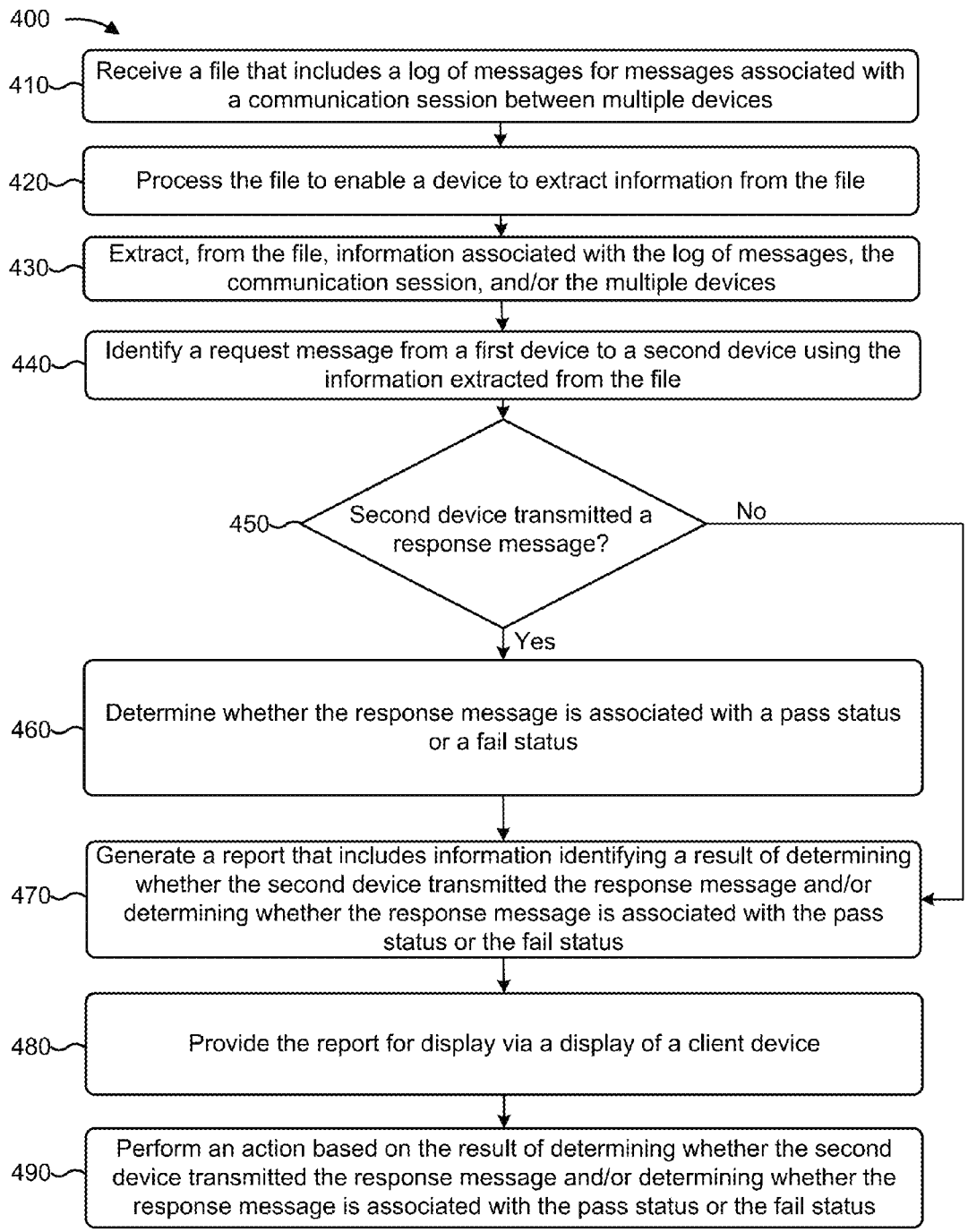
FIG. 4 is a flow chart of an example process for automatically verifying logic of protocol messages exchanged between devices during a communication session.

FIG. 4 is a flow chart of an example process 400 for automatically verifying logic of protocol messages exchanged between devices during a communication session. In some implementations, one or more process blocks of FIG. 4 may be performed by server device 220. In some implementations, one or more process blocks of FIG. 4 may be performed by another device or a group of devices separate from or including server device 220, such as network device 210 and client device 230.

As shown in FIG. 4, process 400 may include receiving a file that includes a log of messages for messages associated with a communication session between multiple devices (block 410). For example, server device 220 may receive a file that includes a log of messages for messages associated with a communication session between network devices 210. In some implementations, server device 220 may receive the file in real-time or near real-time (e.g., as the messages are exchanged between network devices 210), according to a schedule, or based on a request by server device 220.

In some implementations, the file received by server device 220 may be a pcap file or a similar type of file. In some implementations, the log of messages may include logs of request messages and response messages, associated with a protocol, exchanged between network devices 210. For example, the request messages and response messages may be associated with a protocol, such as a Session Initiation Protocol (SIP), a Session Announcement Protocol (SAP), a Real-Time Transport Protocol (RTP), a Session Real-Time Transport Protocol (SRTP), a Real-Time Streaming Protocol (RTSP), a Session Description Protocol (SDP), or the like.

In some implementations, the communication session may include an information exchange between network devices 210, such as a dialog, a conversation, a meeting, or the like. For example, the communication session may include a Voice over Internet Protocol (VoIP) communication session, a Voice over Long Term Evolution (VoLTE) communication session, or the like.

In some implementations, server device 220 may receive the file from network device 210 and may store the file. In some implementations, server device 220 may receive multiple files from multiple network devices 210 (e.g., based on each of the multiple network devices 210 tracking request messages and response messages). In some implementations, server device 220 may receive the file from a directory, such as an upload directory, that stores files from multiple network devices 210, for example. In some implementations, server device 220 may receive the file at the conclusion of the communication session and/or during the communication session. In some implementations, server device 220 may receive the file periodically, at a configured interval, for example. Alternatively, or additionally, server device 220 may receive the file based on a request for the file from server device 220 to network device 210.

In some implementations, the file may include information that identifies a network device 210. For example, the file may include hostnames, IP addresses, or the like, of network devices 210 that are communicating during the communication session.

Alternatively, and/or additionally, the file may include information identifying a type of communication session and/or a call type associated with the communication session. For example, the file may include information identifying that the communication session is a VoIP communication session, a VoLTE communication session, or the like. Alternatively, and/or additionally, the file may include information identifying the call type as, for example, a call forwarding no answer (CFNA) call type, a call forwarding unconditional (CFU) call type, a call forwarding busy (CFB) call type, a call waiting (CW) call type, a 3-way call scenario, a conference call (CONF) call type, a call hold (CH) call type, an Internet protocol multimedia subsystem (IMS)-anchored voice call type, or the like.

In some implementations, server device 220 may identify the call type using information included in the request or response message (e.g., in a header of a SIP request message or a SIP response message). For example, server device 220 may identify the call type as CFNA, CFU, or CFB by identifying a reason (e.g., no answer, unconditional, user-busy, etc.) for the forwarded call using a diversion header of the SIP header and comparing that information to a "To" field of the SIP header. As another example, server device 220 may identify the call type as CONF by identifying a conference server (e.g., "ConfServer") for the call using information included in the SIP header and identifying SDP call hold attributes in the body of the SIP request message or SIP response message.

As another example, server device 220 may identify the call type as call hold (CH) or CW by determining whether the body of the SIP message includes SDP media attributes (e.g., sendonly, recvonly, port zero, or inactive). As another example, server device 220 may identify the call type as an IMS-anchored voice call by identifying location information using P-Access-Network-Info (PANT) included in the SIP header. As another example, server device 220 may identify the call type as voicemail by determining whether the SIP header includes information for routing the call to voicemail (e.g., an IP address, a telephone number, etc.).

As further shown in FIG. 4, process 400 may include processing the file to enable a device to extract information from the file (block 420). For example, server device 220 may process the file to enable a device to extract information from the file. In some implementations, server device 220 may process the file in association with receiving the file. Additionally, or alternatively, server device 220 may store the file and process the file at a later time.

In some implementations, server device 220 may convert the file from a first file type to a second file type in association with processing the file. For example, server device 220 may convert the file from a pcap file, or a similar type of file, to a text file, a comma separated values (CSV) file, an excel file, or the like. Alternatively, and/or additionally, server device 220 may convert the file by reading information from the file and/or may modify data in the file so that the data conforms to a particular formatting requirement (e.g., by adding, deleting, or modifying header information in the file, organizing the information included in the file into rows and/or columns, adding/deleting metadata to the file, etc.). In some implementations, server device 220 may process the file to enable extraction of information from the file by a particular program and/or to enable presentation of information included in the file using a particular program, such as Excel, for example (e.g., by modifying formatting of the information in the file, applying formatting standards to the information in the file, etc.). Alternatively, and/or additionally, server device 220 may process the file to enable information to be presented in a human-readable format (e.g., by converting information in the file from binary code to text).

As further shown in FIG. 4, process 400 may include extracting, from the file, information associated with the log of messages, the communication session, and/or the multiple devices (block 430). For example, server device 220 may extract, from the file, information associated with the log of messages, the communication session, and network devices 210. In some implementations, server device 220 may extract the information from the file by reading information from the file, exporting information from the file, or the like.

In some implementations, when extracting information associated with the log of messages, server device 220 may extract from the file or assign to the log of messages an identifier that identifies a particular log in the log of messages. For example, the identifier that identifies a particular log in the log of messages may include a sequential log number, a log name, or the like.

In some implementations, when extracting information associated with the log of messages, server device 220 may extract a uniform resource identifier that identifies a source location of the file. For example, server device 220 may extract a uniform resource locator (URL), a uniform resource name (URN), a file name, a path in a directory, or the like, of the file.

In some implementations, when extracting information associated with the log of messages, server device 220 may extract information associated with request messages and/or response messages between network devices 210. For example, server device 220 may extract information identifying a type of request message between network devices 210. In some implementations, information identifying a type of request message between network devices 210 may include information identifying a type of a SIP request message from a first network device 210 to a second network device 210. For example, the extracted information may identify the type of SIP request message as a REGISTER request message, an INVITE request message, a provisional response acknowledgement (PRACK) request message, a SUBSCRIBE request message, a NOTIFY request message, an INFO request message, or the like.

Alternatively, and/or additionally, server device 220 may extract information identifying a type of response message between network devices 210. In some implementations, the extracted information identifying a type of response message between network devices 210 may include information identifying a type of a SIP response message between a first network device 210 and a second network device 210. For example, the extracted information may identify the type of SIP request message as a 1xx provisional response message, a 2xx successful response message, a 3xx redirection response message, a 4xx client failure response message, a 5xx server failure response message, or the like.

Alternatively, and/or additionally, server device 220 may extract identifiers associated with the request messages and/or response messages. For example, server device 220 may extract a uniform resource identifier (URI), a command sequence (Cseq) number, or the like, that identifies particular request messages and/or response messages.

In some implementations, server device 220 may extract information associated with the communication session. For example, server device 220 may extract information that identifies a type of communication session and/or a call type associated with the communication session. For example, server device 220 may extract information that identifies the call type as a CFNA call type, a CFU call type, a CFB call type, a CW call type, a 3-way call type, a CONF call type, a CH call type, an IMS-anchored voice call type, or the like.

In some implementations, server device 220 may extract information associated with network devices 210. For example, server device 220 may extract information identifying a first network device 210 as a requester network device 210 (e.g., a network device 210 that transmits a request message) and/or a second network device 210 as a responder network device 210 (e.g., a network device 210 that transmits a response message based on receiving a request message).

In some implementations, a user (e.g., of client device 230) may interact with a user interface to specify parameters (e.g., protocol header parameters), parameter values of the parameters, attributes, and/or attribute values of the attributes associated with the protocol. For example, the user may input information identifying Session Description Protocol (SDP) media parameters and/or attributes, SIP parameters and/or attributes, or the like. In some implementations, server device 220 may receive information identifying the parameters, the parameter values, the attributes, and/or the attribute values. In some implementations, server device 220 may extract information from the file based on the user interaction with the user interface. For example, server device 220 may extract information from the file based on identifying the parameters values input via the user interface, the attributes input via the user interface, or the like, in the file.

In some implementations, server device 220 may store the extracted information in a data structure. For example, the data structure may include first information extracted from the file and second information extracted from the file. In some implementations, server device 220 may store the extracted information such that in the data structure, the first information extracted from the file may be associated with the second information extracted from the file.

For example, the data structure may include an assigned sequential log number for the file, a name of the log, and/or a path of the log (e.g., a log name and/or a log path that identifies an upload directory of server device 220). As another example, the data structure may include a "From" field that identifies a telephone number of a calling party, a "To" field that identifies a telephone number of a called party, and a "Forward" calling telephone number. As another example, the data structure may include another path of the log, which may identify an output directory of server device 220. As another example, the data structure may include a "Call Type" field that identifies a call type of a call.

In this way, server device 220 may reduce errors that would otherwise occur during manual inspection of the file and/or may improve efficiency of obtaining information from the file by quickly and/or automatically extracting the information.

As further shown in FIG. 4, process 400 may include identifying a request message from a first device to a second device using the information extracted from the file (block 440). For example, server device 220 may identify a request message from a first network device 210 to a second network device 210 using the information extracted from the file. In some implementations, server device 220 may identify the request message in association with extracting the information associated with the log of messages.

In some implementations, server device 220 may identify a message as a request message using the information extracted from the file. For example, server device 220 may identify the request message based on identifying a type of the message. In such a case, server device 220 may identify a message as a SIP request message based on identifying the type of message as a SIP REGISTER request message and/or a SIP INVITE request message.

In some implementations, server device 220 may identify a message as a request message based on information that is included in the message, such as information included in a start line of the message and/or information included in a header of the message. For example, server device 220 may identify a message as a SIP request message based on determining that a start line of the message includes a request line that identifies the message as a SIP request message as opposed to a request line that identifies the message as a SIP response message.

In some implementations, server device 220 may identify a message as a request message based on an identifier included in the message. For example, server device 220 may identify a message as a request message based on identifying an identifier that identifies the message as a request message.

As further shown in FIG. 4, process 400 may include determining whether the second device transmitted a response message in association with receiving the request message (block 450). For example, server device 220 may determine whether the second device transmitted a response message in association with receiving the request message. In some implementations, server device 220 may determine whether the second device transmitted a response message in association with identifying the request message.

In some implementations, server device 220 may identify a message as a response message using the information extracted from the file. For example, server device 220 may identify the message as a response message based on identifying a type of the message. This may be the case when server device 220 identifies the message as a SIP 1xx provisional response message or a SIP 2xx successful response message.

In some implementations, server device 220 may identify a message as a response message based on information included in the message, such as information included in a start line or in a header of the message. For example, server device 220 may identify a message as a SIP response message based on determining that a start line of the message includes a status line that identifies the message as a SIP response message as opposed to a start line of a message that includes a status line identifying the message as a SIP request message.

In some implementations, server device 220 may identify a message as a response message based on an identifier included in the message. For example, server device 220 may identify a message as a response message based on an identifier included in the message that identifies the message as a response message.

In some implementations, server device 220 may determine whether a second network device 210 transmitted the response message based on receiving a request message from a first network device 210. For example, server device 220 may use information extracted from the file to determine whether a second network device 210 transmitted the response message based on receiving the request message. In some implementations, server device 220 may compare a URI or a Cseq number included in the request message to a URI or a Cseq number included in the response message and may identify the response message as being a response message to the request message when the comparison indicates a match.

As further shown in FIG. 4, if the second device transmitted the response message in association with receiving the request message (block 450—YES), then process 400 may include determining whether the response message is associated with a pass status or a fail status (block 460). For example, server device 220 may determine whether the response message is associated with a pass status or a fail status. In some implementations, server device 220 may determine whether the response message is associated with a pass status or a fail status in association with determining whether the second network device transmitted the response message.

In some implementations, server device 220 may determine that the response message is associated with a pass status based on determining that the response message is an expected response message. For example, an expected response message may include a response message from an intended second network device 210 (e.g., an intended recipient network device 210 of a request message). Alternatively, and/or additionally, an expected response message may include a particular type of response message, such as a SIP 1xx provisional response message, a SIP 2xx successful response message, a SIP 3xx redirection response message, or the like, for example.

In some implementations, server device 220 may determine that the response message is associated with a fail status based on determining that the response message is not an expected response message. For example, an unexpected response message may include a response message from a network device 210 other than an intended second network device 210 (e.g., a particular network device 210 other than the intended recipient network device 210 of the request message). Alternatively, and/or additionally, an unexpected response message may include a particular type of response message, such as a SIP 4xx client failure response message, a SIP 5xx server failure response message, or the like.

In some implementations, server device 220 may determine whether the response message is associated with a pass status or a fail status based on a determination that the response message was received by the first network device 210. For example, server device 220 may determine that the response message is associated with a pass status when server device 220 determines that the response message transmitted by the second network device 210 was received by the first network device 210 (e.g., using the log of messages or other information from the first network device 210 and/or the second network device 210). Alternatively, and/or additionally, server device 220 may determine that the response message is associated with a fail status when server device 220 determines that the response message transmitted by the second network device 210 was not received by the first network device 210.

As further shown in FIG. 4, if the second device has not transmitted the response message in association with receiving the request message (block 450—NO), or if server device 220 has determined whether the response message is associated with a pass status or a fail status (block 460), then process 400 may include generating a report that includes information identifying a result of determining whether the second device transmitted the response message and/or determining whether the response message is associated with the pass status or the fail status (block 470) and providing the report for display via a display of a client device (block 480). For example, server device 220 may generate a report that identifies a pass status or a fail status associated with the response message. In some implementations, server device 220 may generate the report in association with determining whether the second device transmitted the response message and/or in association with determining whether the response message is associated with the pass status or the fail status.

In some implementations, server device 220 may generate a report that includes information associated with the request message and/or the response message. For example, server device 220 may generate a report that identifies a type of the request message (e.g., identifies the request message as a SIP INVITE request message or a SIP PRACK request message). As another example, server device 220 may generate a report that identifies a type of the response message (e.g., identifies the response message as a SIP 1xx provisional response message or a 2xx successful response message). Alternatively, and/or additionally, server device 220 may generate a report that identifies network devices 210. For example, server device 220 may generate a report that identifies the first network device 210 as the particular network device 210 that transmitted the request message and/or that identifies the second network device 210 as the particular network device 210 that transmitted the response message (e.g., by including information that identifies a telephone number or an IP address of the first network device 210 and/or the second network device 210).

In some implementations, server device 220 may generate a diagram, such as a call flow diagram and/or or a ladder diagram, that includes information associated with request messages and/or response messages exchanged between network devices 210. For example, server device 220 may generate a call flow diagram that displays a visual representation of request messages and/or response messages being exchanged between network devices 210.

Alternatively, and/or additionally, server device 220 may generate a diagram that includes information identifying a type of a request message and/or a response message transmitted between network devices 210. Alternatively, or additionally, server device 220 may generate a diagram that includes information that identifies network devices 210 that are associated with the request message and/or response message, such as information that identifies a telephone number and/or an IP address of network devices 210 exchanging request messages and/or response messages.

In some implementations, server device 220 may provide the report to client device 230 for display via a display of client device 230. In some implementations, server device 220 may provide the report for display to enable a network administrator and/or a vendor to identify a response associated with a fail status or a pass status. For example, the network administrator and/or the vendor may use the report to identify a particular network device 210 that generated the response, a particular network device 210 that failed to generate a response, the type of response generated, or the like. Alternatively, and/or additionally, server device 220 may provide information associated with the request message and/or the response message to a storage location, such as an output directory, for storage, for example.

As further shown in FIG. 4, process 400 may include performing an action based on the result of determining whether the second device transmitted the response message and/or determining whether the response message is associated with the pass status or the fail status (block 490). For example, server device 220 may perform an action based on the result of determining whether the second device transmitted the response message and/or determining whether the response message is associated with the pass status or the fail status. In some implementations, server device 220 may perform the action in association with providing the report for display via a display of client device 230.

In some implementations, server device 220 may identify a particular network device 210 that failed to transmit the response message and/or transmitted a response message that is associated with a fail status (e.g., based on information extracted from the file). In some implementations, server device 220 may provide for display, via a display of client device 230, information that identifies the particular network device 210 that failed to transmit the response message and/or transmitted a response message that is associated with a fail status.

In some implementations, server device 220 may direct network device 210 to retransmit the request message using an alternate route (e.g., to bypass the particular network device 210 that failed to transmit the response message).

Alternatively, or additionally, server device 220 may direct one or more network devices 210 to reboot, to retransmit the request and/or response messages, and/or to check for software and/or application updates for the one or more network devices 210 by transmitting a command or a message to the one or more network devices 210 (e.g., to fix the cause of the failed response message or the response message associated with the fail status). Alternatively, or additionally, server device 220 may transmit a message to a network administrator, or schedule the network administrator (e.g., by adding an entry to an electronic calendar of the network administrator), to repair the one or more network devices 210 and/or a transmission line between the one or more network devices 210, such as when network device 210 fails to receive a response message.

Alternatively, or additionally, server device 220 may transmit a message to a vendor of network device 210 to notify the vendor that network device 210 failed to transmit a response message or transmitted a response message that is associated with a failed status. By performing an action based on a result of determining whether a second network device 210 transmitted a response message and/or determining whether the response message is associated with the pass status or the fail status, server device 220 may improve efficiency of correcting a fail status associated with a response message.

In some implementations, when performing the action, server device 220 may generate the report and/or provide the report for display. In other words, block 490 may include block 470 and/or block 480.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5M are diagrams of an example implementation 500 relating to example process 400 shown in FIG. 4.

Figure 5A:
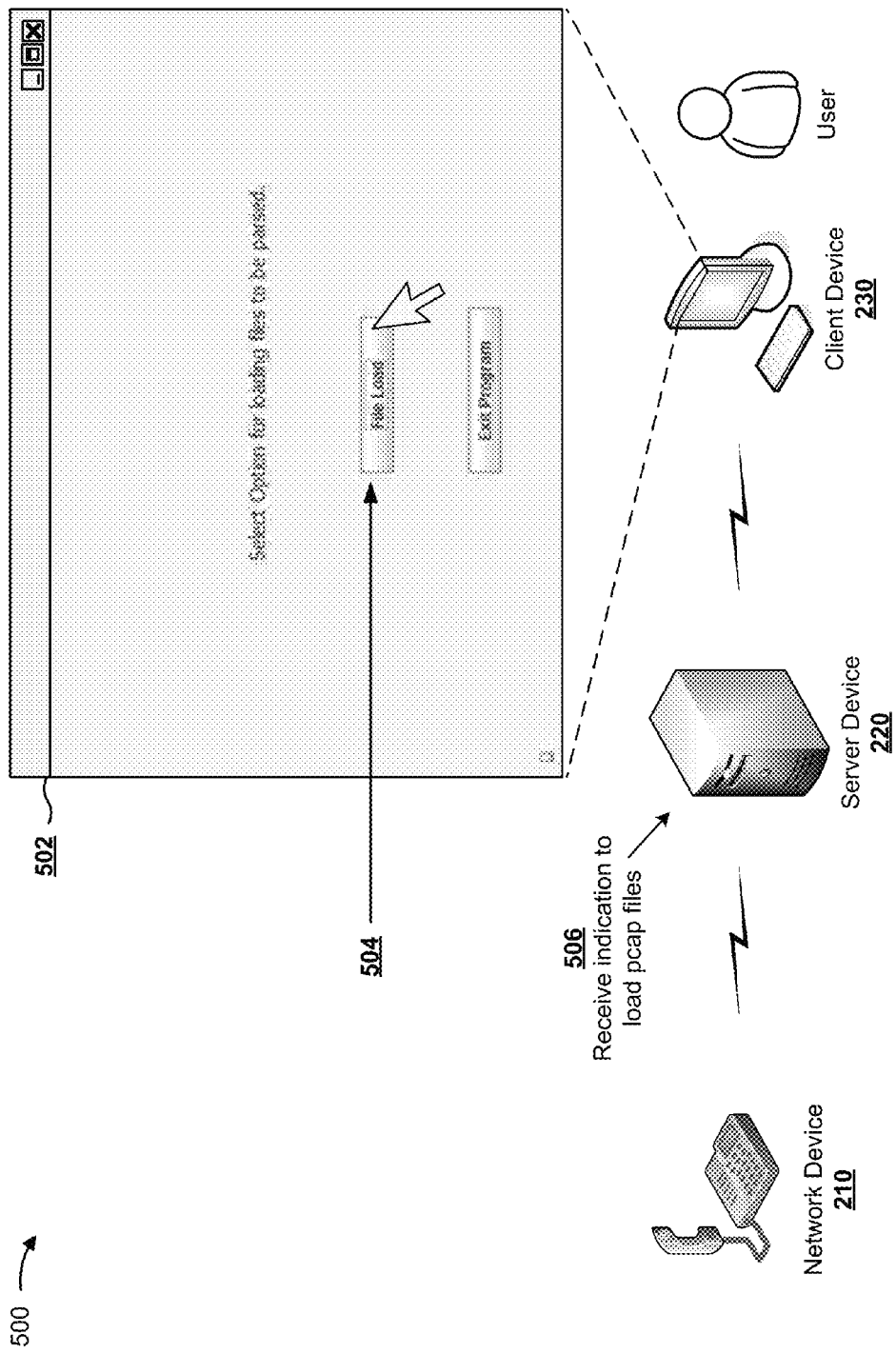
FIGS. 5A-5M are diagrams of an example implementation relating to the example process shown in FIG. 4.

In example implementation 500, and as shown in FIG. 5A, client device 230 may provide a user interface for display, and a user of client device 230 may use the user interface to load a pcap file, or a similar type of file, for processing. For example, a user of client device 230 may use user interface 502 and "File Load" button 504 to load a pcap file, or a similar type of file, for processing by server device 220. As shown by reference number 506, server device 220 may receive an indication to load the pcap file, or a similar type of file, based on the user interaction with "File Load" button 504 of user interface 502.

Figure 5B:
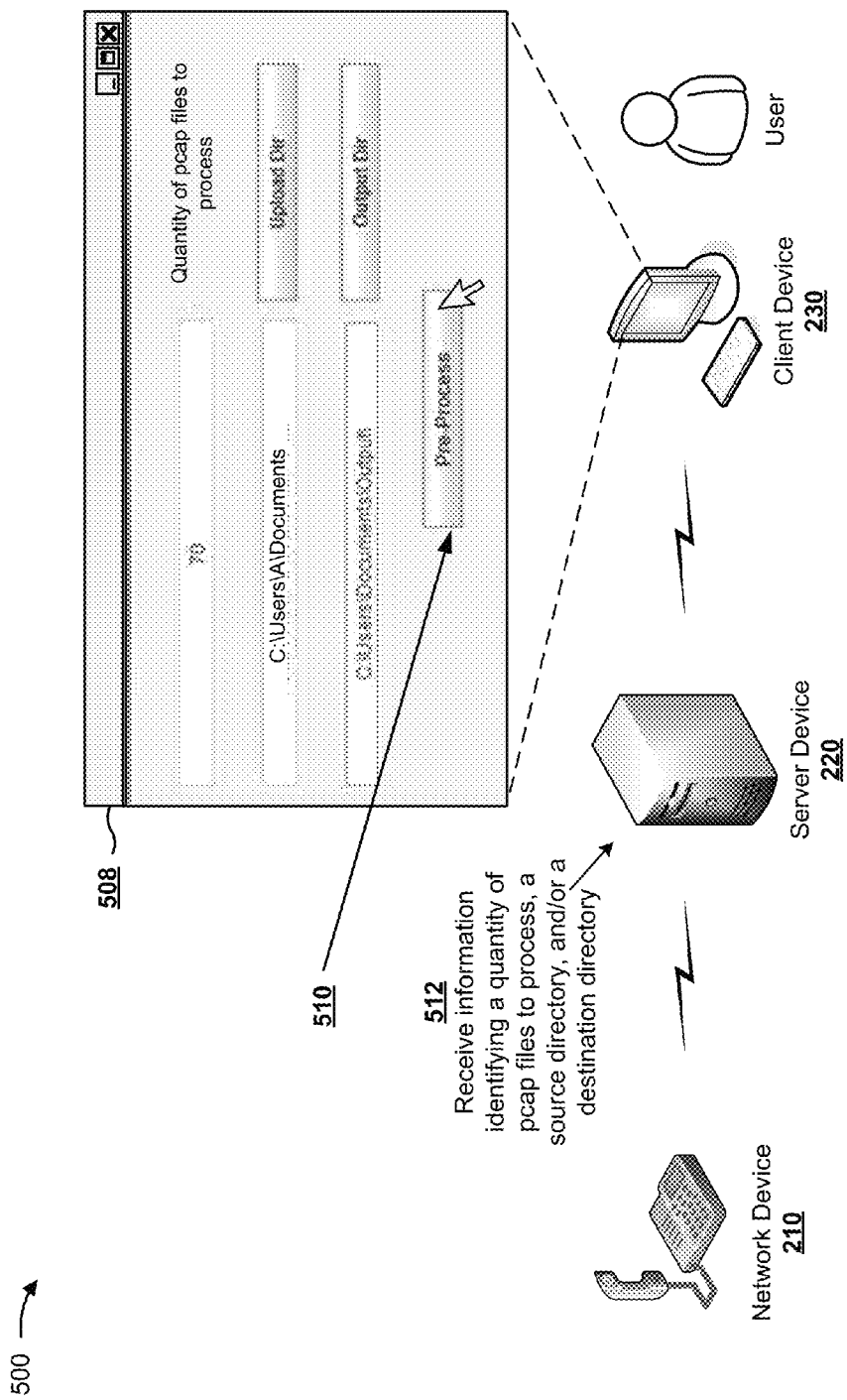

In example implementation 500, and as shown in FIG. 5B, the user may use user interface 508 to specify a quantity of pcap files, or similar types of files, (e.g., 70) to process. The user also may specify a source location, such as an upload directory, for the pcap files, or similar types of files, (e.g., shown as C:\Users\A\Documents) and a destination location, such as an output directory, for the pcap files, or similar types of files, or other information (e.g., shown as C:\Users\Documents\Output\). A user of client device 230 may select "Pre-Process" button 510 to cause server device 220 to process the pcap files, or similar types of files. As shown by reference number 512, server device 220 may receive information identifying the quantity of pcap files, or similar types of files, to process, the source location for the pcap files, or similar types of files, and/or the destination location for the pcap files, or similar types of files, and/or the other information.

Figure 5C:
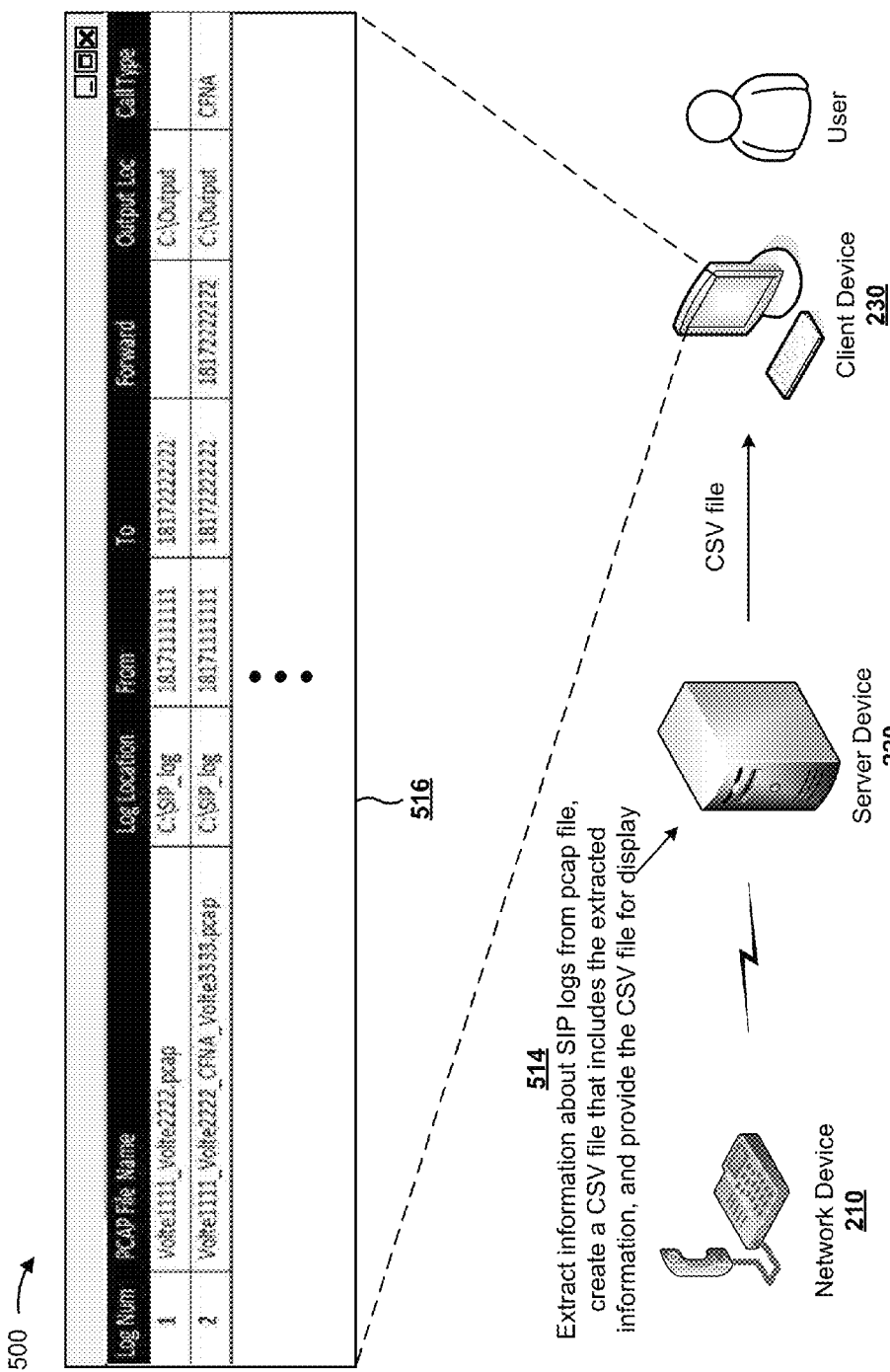

In example implementation 500, and as shown in FIG. 5C, server device 220 may process the pcap files, or similar types of files. For example, and as shown by reference number 514, server device 220 may extract information about SIP logs from the pcap file, or a similar type of file, create a CSV file that includes the extracted information, and provide the CSV file to client device 230 for display. As further shown in FIG. 5C, the CSV file may include information associated with pcap files, or similar types of files. For example, as shown by reference number 516, the CSV file may include information that identifies a log number, a pcap file name, or name of a similar type of file, a log location, a "From" network device identifier, a "To" network device identifier, a call "Forward" network device identifier, an output location, and a call type, etc. associated with the pcap file, or a similar type of file. As further shown in FIG. 5C, server device 220 may provide the CSV file for display via client device 230.

Figure 5D:
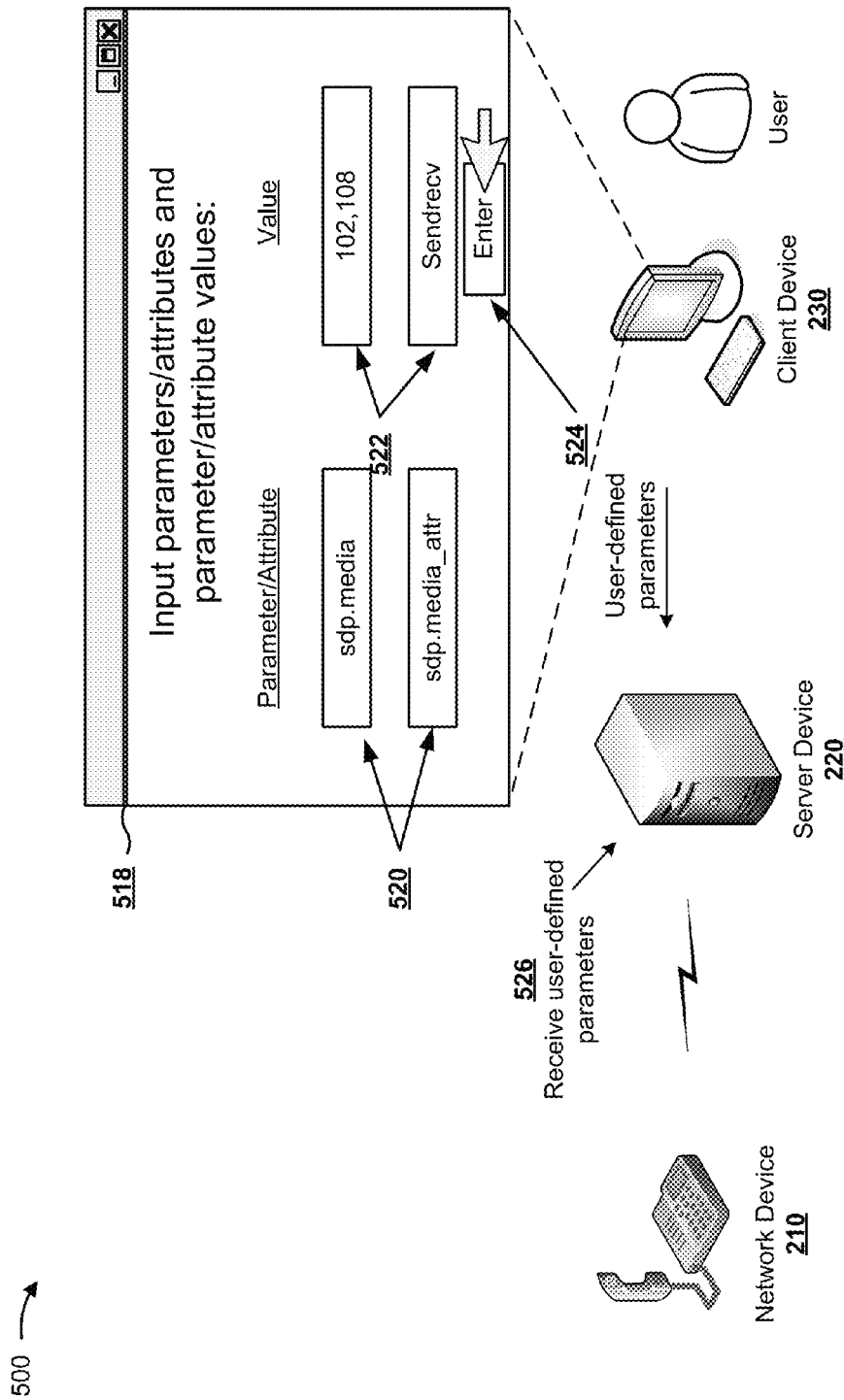

In example implementation 500, and as shown in FIG. 5D, the user may input information identifying parameters/attributes and/or parameter/attribute values that the user wants server device 220 to identify in the pcap files, or similar types of files. For example, a user may input parameters/attributes and/or parameter/attribute values into user interface 518 that the user wants server device 220 to identify in the pcap files, or similar types of files. As shown by reference number 520, a user may input "sdp.media" and "sdp.media_attr" as parameters/attributes. As show by reference number 522, a user may input values for "sdp.media" of "102" and "108" and a value for "sdp.media_attr" of "Sendrecv." As shown by reference number 524, a user may select an "Enter" button displayed by user interface 518, which may cause server device 220 to receive the information identifying the parameters/attributes and/or the parameter/attribute values. As shown by reference number 526, server device 220 may receive the user-defined parameters/attributes and/or parameter/attribute values from client device 230 based on the user selecting the "Enter" button.

Figure 5E:
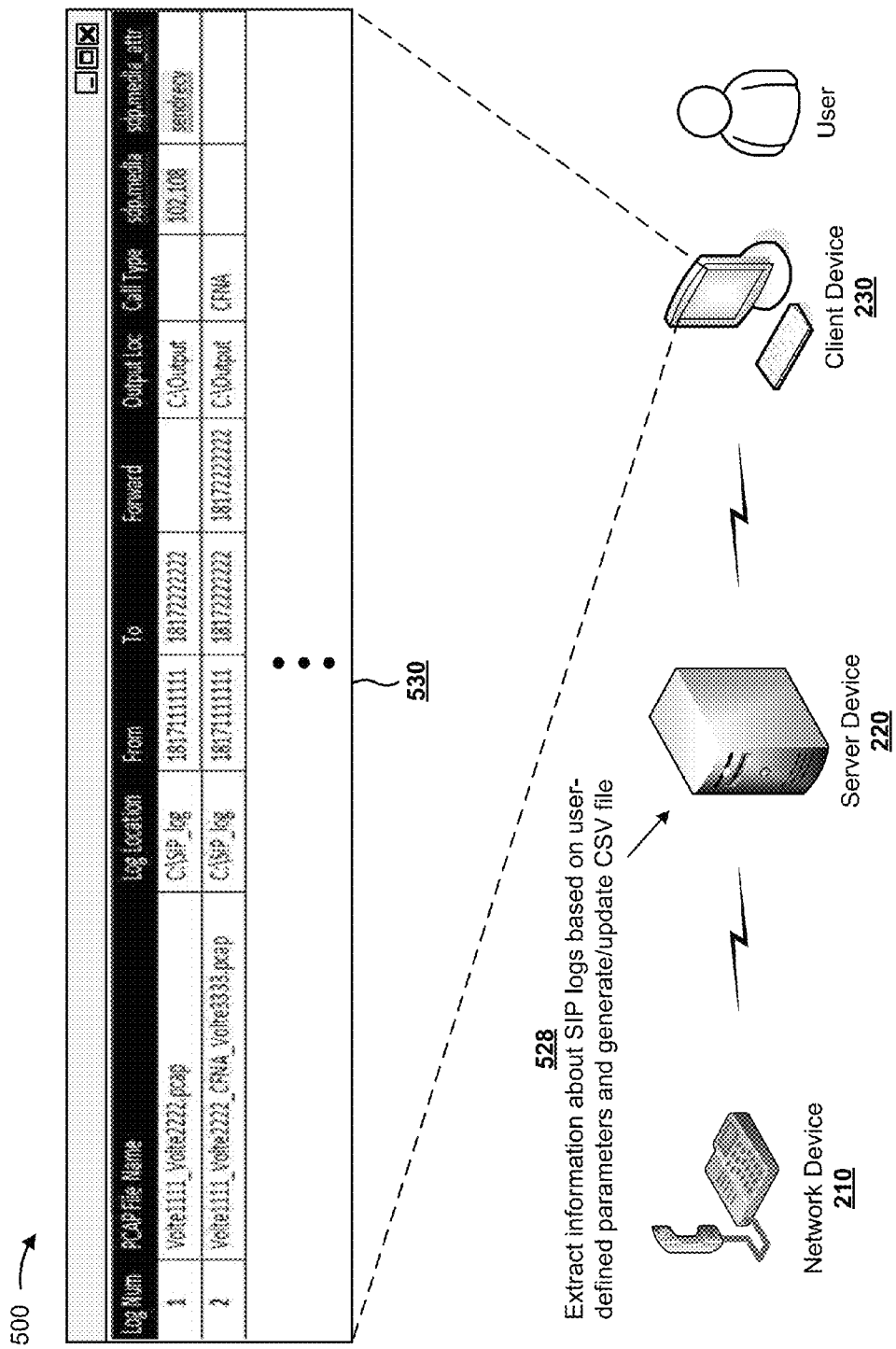

In example implementation 500, and as shown in FIG. 5E, server device 220 may process the pcap files based on the user input. For example, and as shown by reference number 528, server device 220 may extract information about SIP logs from the pcap file based on the user-defined parameters/attributes and/or parameter/attribute values. Server device 220 may generate a CSV file, similar to that described above, and/or may update a previously generated CSV file with information extracted from the pcap file based on the user input.

As shown by reference number 530, the CSV file may include information associated with the pcap files, or similar types of files, including information extracted from the pcap file, or a similar type of file, based on the user input. For example, the CSV file may include information identifying a log number of a log, a pcap file name, or a name of a similar type of file, a log location, a "From" network device identifier, a "To" network device identifier, a call "Forward" network device identifier, an output location, and/or a call type. The CSV file may further include information associated with the user-defined parameters/attributes, such as a field for each of the user-defined parameters/attributes (e.g., an "sdp.media" column and an "sdp.media_attr" column) and values extracted from the pcap files, or similar types of files, for the parameters/attributes (e.g., shown as "102,108" in the "sdp.media" field and "sendrecv" in the "sdp.media_attr" field for log number 1). As further shown in FIG. 5E, server device 220 may highlight or otherwise annotate parameter/attribute values extracted from the pcap file, or a similar type of file, thereby enabling a user of client device 230 to quickly and efficiently identify particular logs that include the user-defined parameters/attributes and/or parameter/attribute values.

Figure 5F:
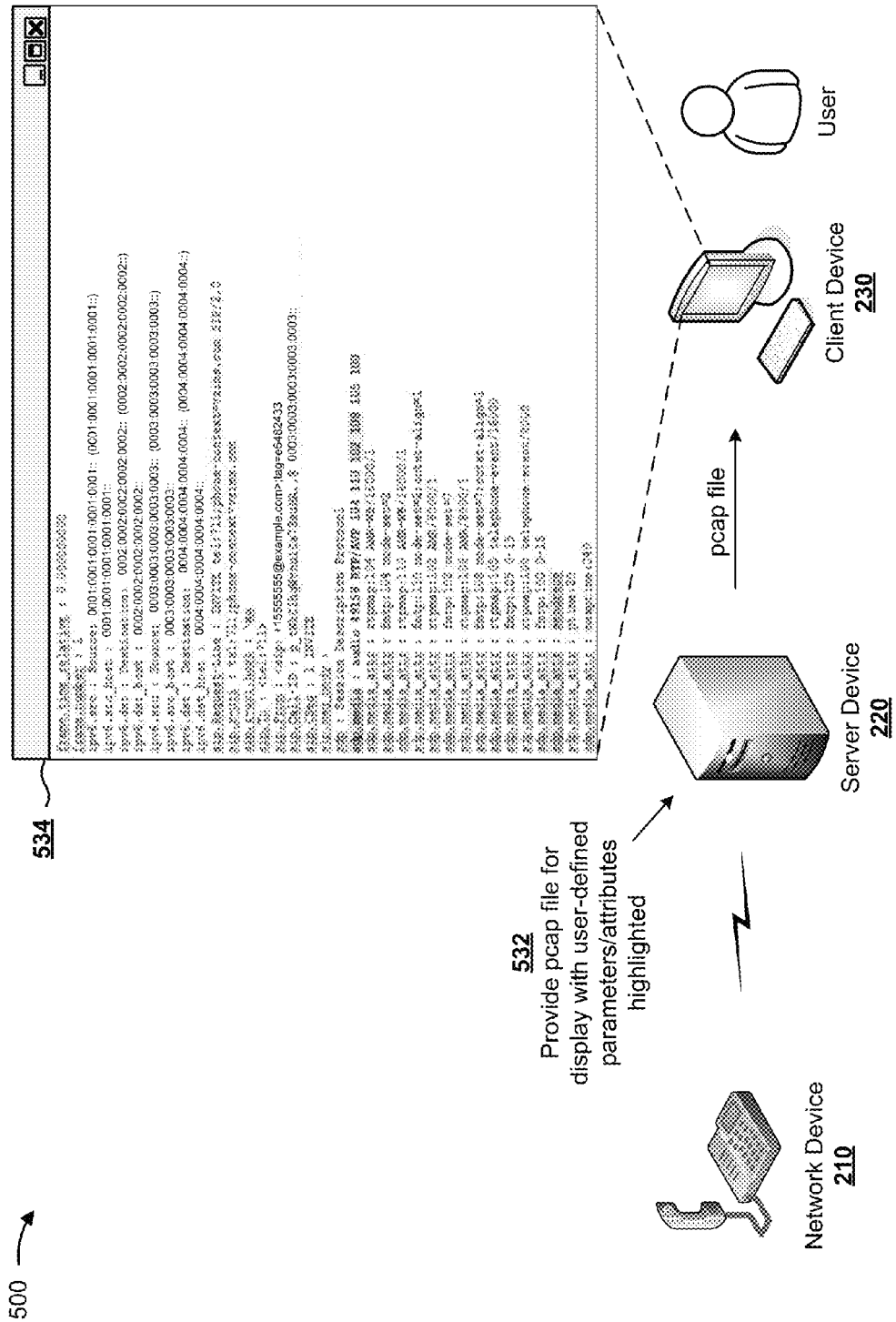

In example implementation 500, and as shown in FIG. 5F, server device 220 may provide pcap files for display via client device 230, and may highlight or annotate the user-defined parameters/attributes and/or parameter/attribute values. For example, and as shown by reference number 532, server device 220 may provide pcap files for display via client device 230 with the user-defined parameters/attributes "sdp.media" and "sdp.media_attr" highlighted and the parameter/attribute values "102," "108," and "sendrecv" highlighted. As further shown in FIG. 5F, client device 230 may provide the pcap file for display via user interface 534.

Figure 5G:
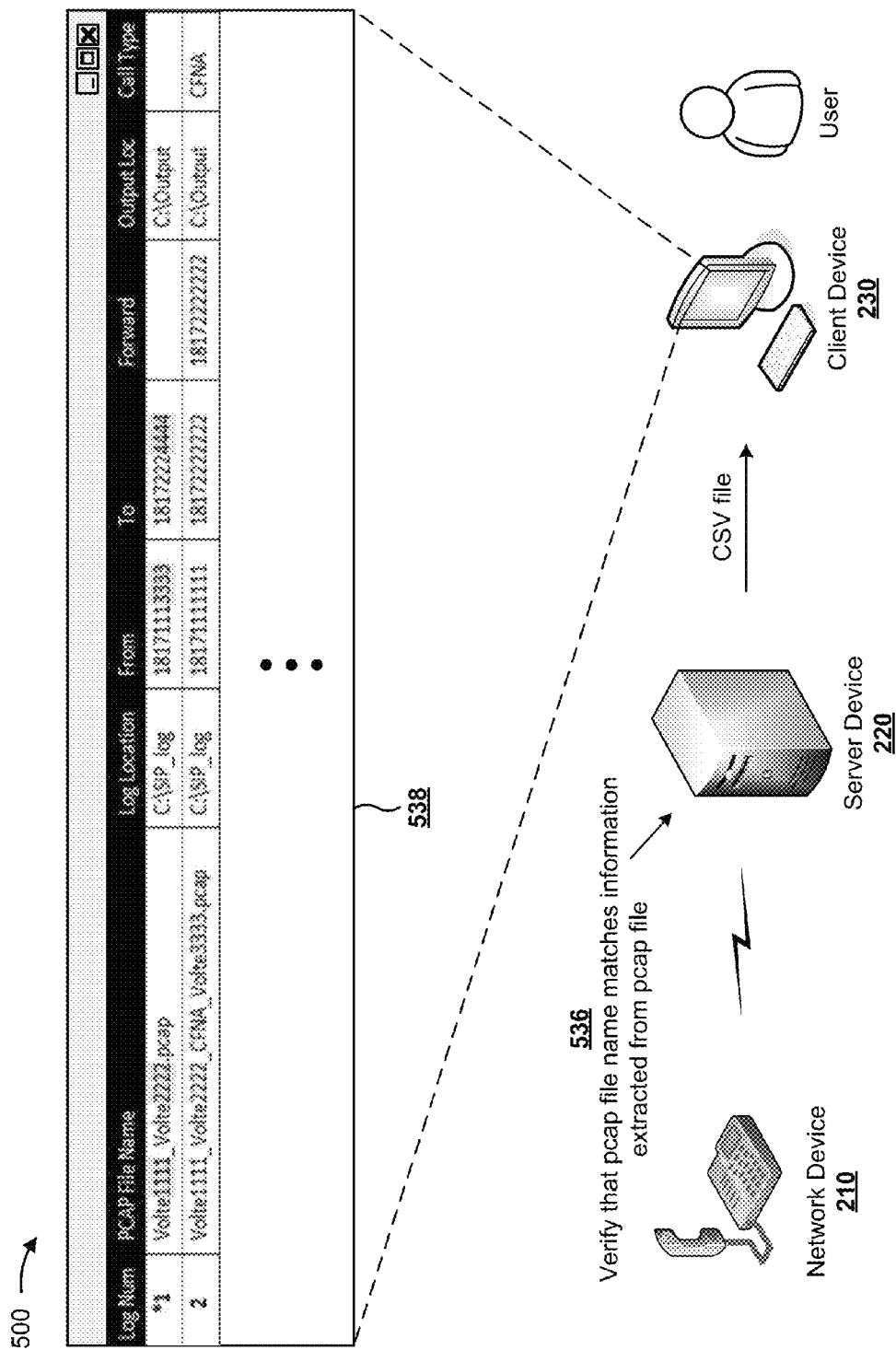

In example implementation 500, and as shown in FIG. 5G, and by reference number 536, server device 220 may verify that the file name of the pcap file, or a similar type of file, matches information included in the pcap file, or a similar type of file. For example, with respect to log number 1, server device 220 may compare "To" and/or "From" network device 210 identifiers in the pcap file name, or name of a similar type of file, and "To" and/or "From" network device 210 identifiers extracted from the pcap file, or a similar type of file. When a result of the comparison indicates a mismatch or does not indicate a match, server device 220 may annotate information included in the CSV file.

As shown by reference number 538, the pcap file name for log number 1 indicates that the call type of the call is VoLTE, that the last four digits of the "From" network device 210 identifier are "1111," and that the last four digits of the "To" network device 210 identifier are "2222." As further shown by reference number 538, the "From" field for log number 1 indicates that the last four digits of the "From" network device 210 identifier are "3333" and the "To" field for log number 1 indicates that the last four digits of the "To" network device 210 identifier are "4444." Because the "To" and/or "From" network device 210 identifiers in the pcap file name for log number 1 do not match the network device 210 identifiers in the "From" and/or "To" fields for log number 1, server device 220 may include an asterisk, or another annotation, in the associated log number field (e.g., shown as "1") to indicate the comparison failed to result in a match. In addition, server device 220 may highlight and/or annotate values in the "From" and/or "To" fields based on the comparison failing to result in a match. This enables a user of client device 230 to quickly and efficiently identify particular SIP logs that may need to be further excluded from processing and/or that may require manual inspection (e.g., due to including inconsistent "From" and/or "To" network device 210 identifiers).

Figure 5H:
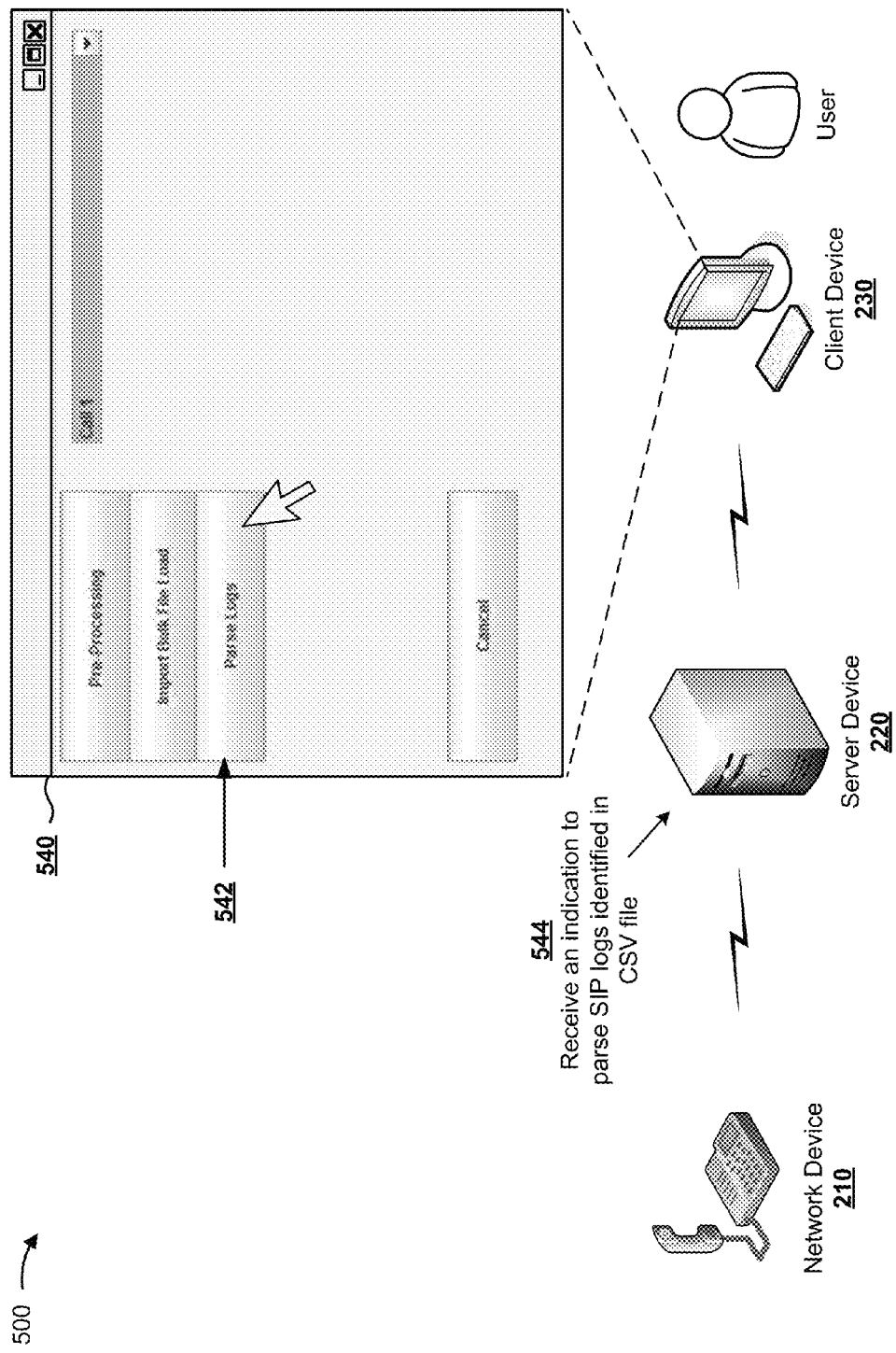

In example implementation 500, and as shown in FIG. 5H, a user may use user interface 540 to cause server device 220 to process (e.g., parse) SIP logs identified in the CSV file (e.g., by selecting "Parse Logs" button 542). As shown by reference number 544, based on the user selecting "Parse Logs" button 542, server device 220 may receive an indication to parse SIP logs identified in the CSV file.

Figure 5I:
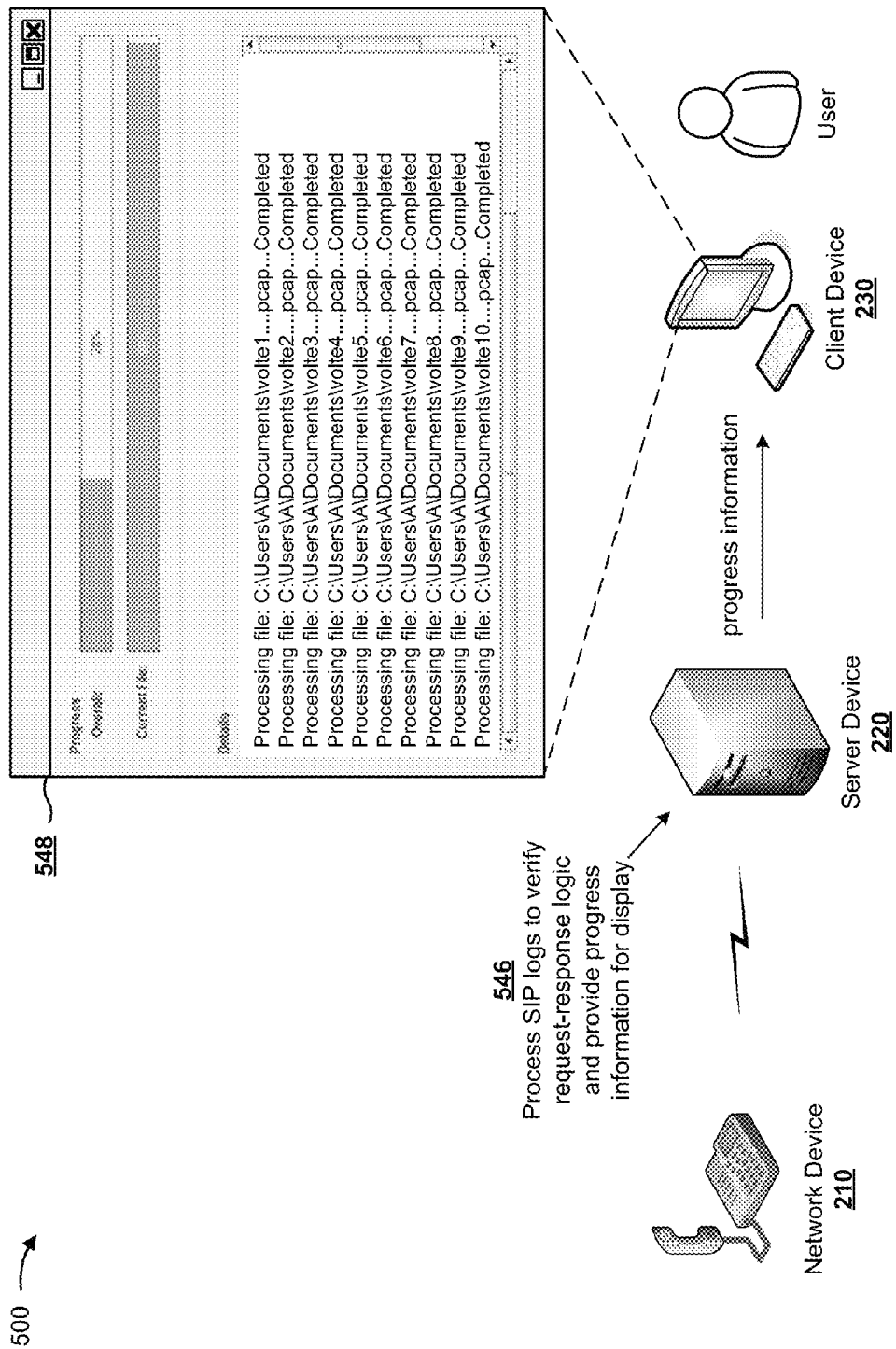

As shown in FIG. 5I, and by reference number 546, server device 220 may process SIP logs to verify request-response logic of SIP request and response messages. For example, as described elsewhere herein, server device 220 may process SIP logs to determine whether a SIP request message is associated with a corresponding SIP response message and whether the corresponding SIP response message is an expected SIP response message. As further shown by reference number 546, server device 220 may provide progress information for display via user interface 548 of client device 230. Progress information may identify a percentage of SIP logs processed of a total quantity of SIP logs to be processed, a percentage processed of a particular SIP log, or the like.

Figure 5J:
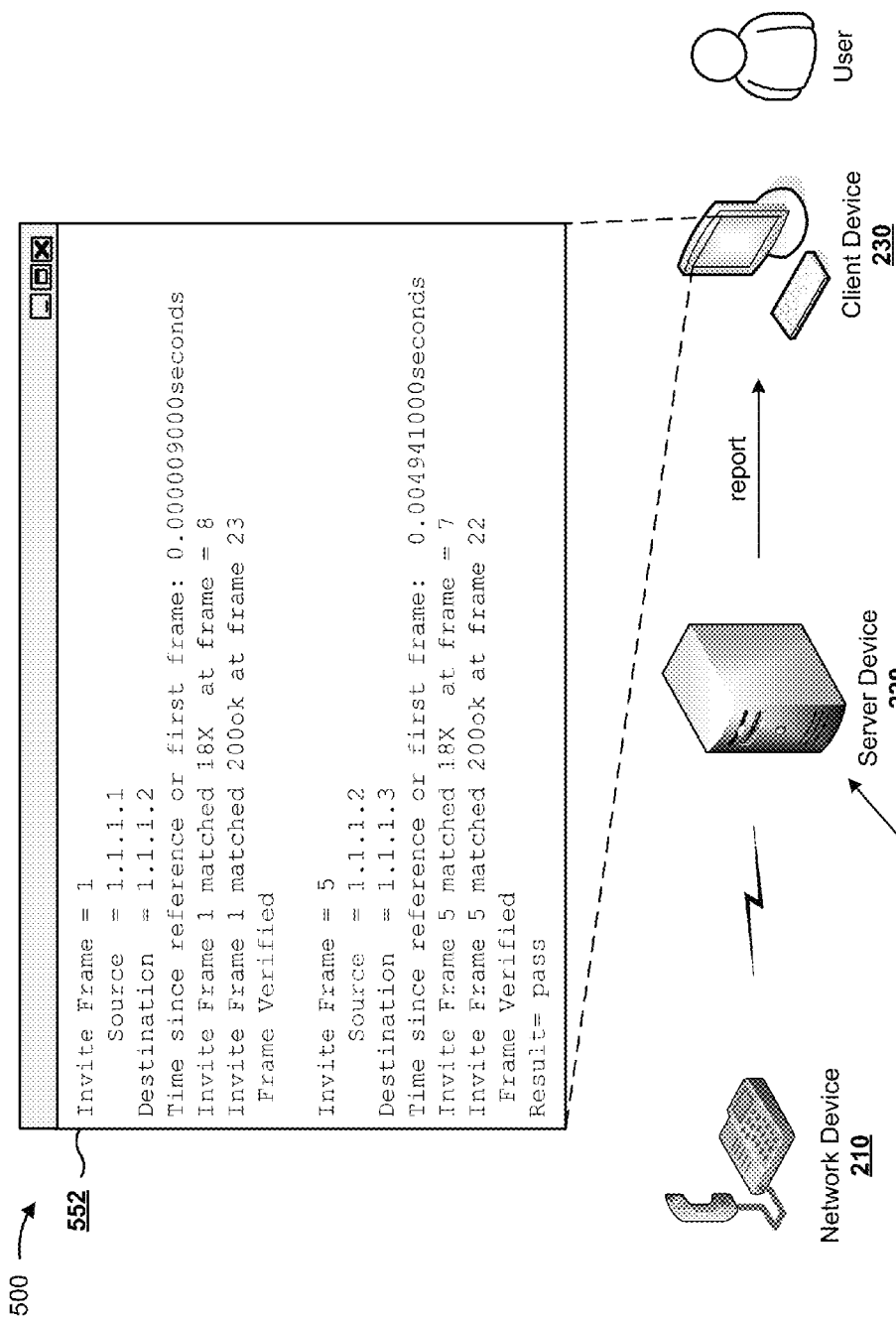

As shown in FIG. 5J, and by reference number 550, server device 220 may generate a report indicating that a SIP log is associated with a pass status and may provide the report for display via client device 230. The report may include information associated with the exchange of SIP request messages and SIP response messages. For example, the report may include frame information identifying a particular frame on which a SIP request message or a SIP response message was identified. As another example, the report may include source and/or destination IP addresses of the SIP request message and/or the SIP response message.

As another example, the report may include time since reference or first frame information that identifies a time reference for each frame. As another example, the report may include matching information that identifies a SIP response message that corresponds to a SIP request message. As another example, the report may include a frame verification indication that indicates that a SIP request message and a SIP response message have been verified (e.g., that the logic has been verified). As another example, the report may include information identifying a result (e.g., a pass result or a fail result) based on verifying the logic of SIP request and SIP response messages.

User interface 552 shows that a SIP INVITE request message transmitted from a first network device 210 (e.g., with IP address 1.1.1.1) to a second network device 210 (e.g., with IP address 1.1.1.3), via a third network device 210 (e.g., with IP address 1.1.1.2), matches a SIP 18x response message and a SIP 200 OK response message transmitted from the second network device 210 to the first network device 210, via the third network device 210. As further shown by user interface 552, the report may include information indicating that verification of the request-response logic produces a pass result. Based on verification of the logic of the SIP request-response messages producing a pass result, user interface 552 shows an example of a report that is associated with a pass status.

Figure 5K:
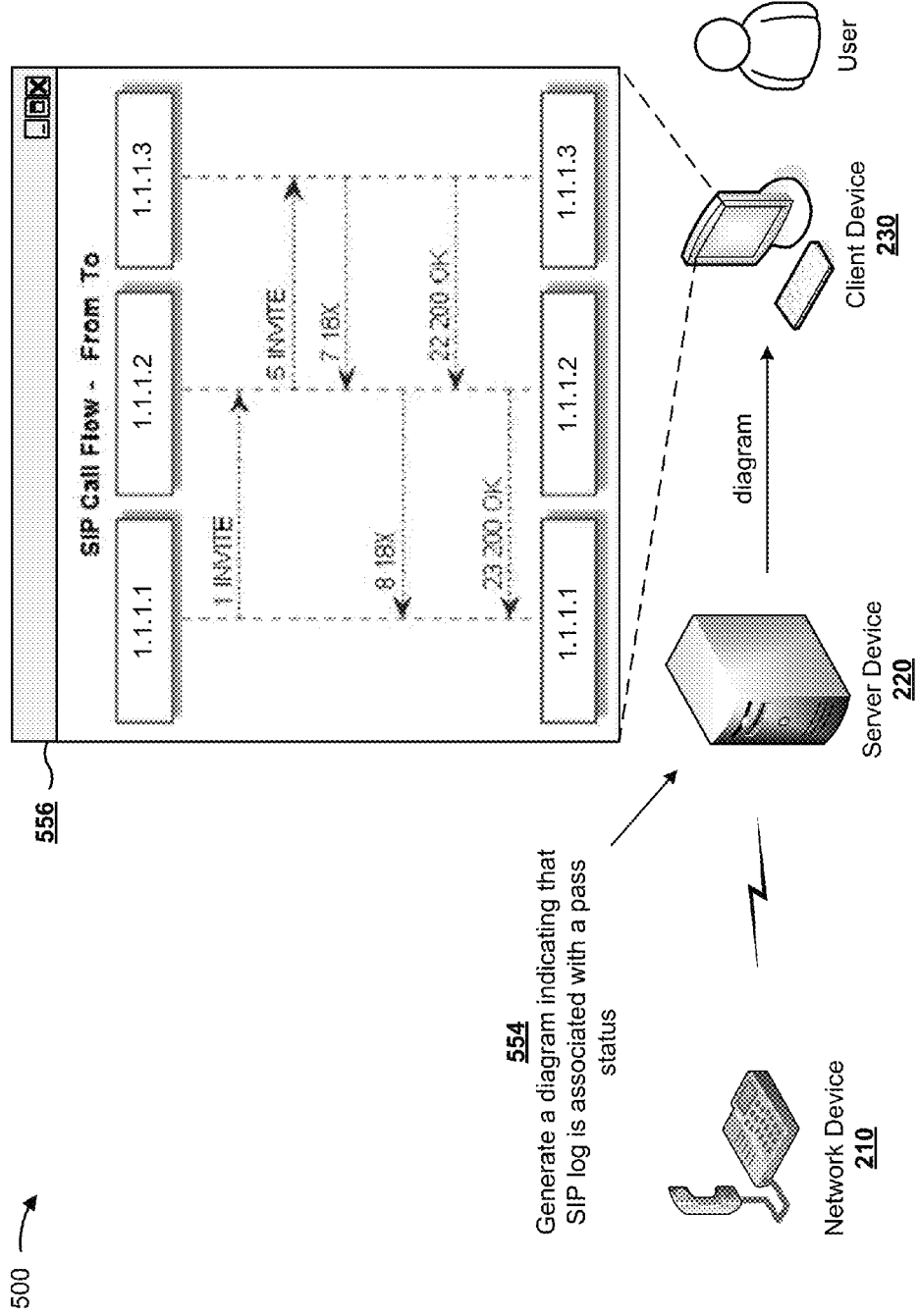

As shown in FIG. 5K, and by reference number 554, server device 220 may generate a diagram indicating that the SIP log is associated with a pass status and that provides a visual representation of the request-response logic. As further shown in FIG. 5K, server device 220 may provide the diagram to client device 230 for display. For example, user interface 556 shows a call flow diagram that shows a SIP INVITE request message transmitted from the first network device 210 to the second network device 210, as described with respect to FIG. 5J, thereby providing a network-wide view of transmission and receipt of the SIP INVITE request message. The call flow diagram displayed by user interface 556 further shows a SIP 18x response message and a SIP 200 OK response message transmitted based on receiving the SIP INVITE request message. Based on verification of the SIP request-response messages producing a pass result, user interface 556 shows an example of a call flow diagram for request and/or response messages associated with a pass status.

Figure 5L:
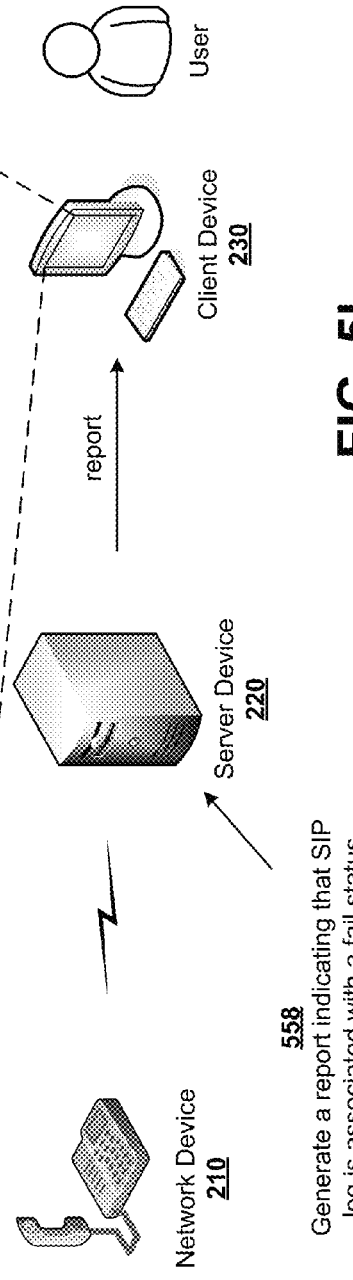

As shown in FIG. 5L, and by reference number 558, server device 220 may generate a report indicating that a SIP log is associated with a fail status. As further shown in FIG. 5L, server device 220 may provide the report to client device 230 for display. For example, user interface 560 shows that one or more SIP INVITE request messages from source network devices 210 to destination network devices 210 match a SIP ERROR 403 Forbidden response message, thereby producing a fail result. Based on verification of the logic of the SIP request-response messages producing a fail result, user interface 560 shows an example of a report that is associated with a fail status.

Figure 5M:
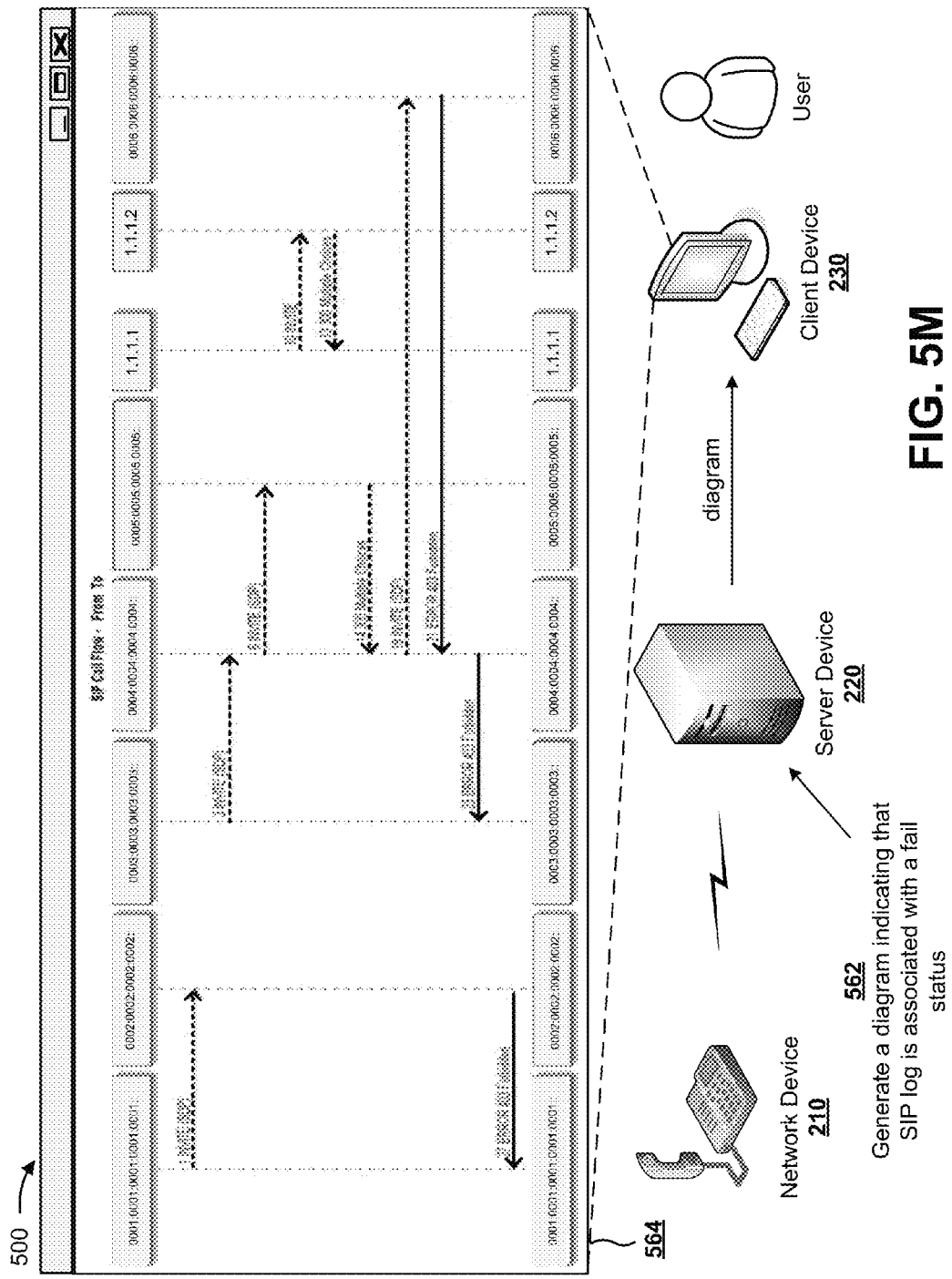

As shown in FIG. 5M, and by reference number 562, server device 220 may generate a diagram indicating that a SIP log is associated with a fail status. As further shown in FIG. 5M, server device 220 may provide the SIP log to client device 230 for display. For example, client device 230 may display a call flow diagram, associated with the one or more SIP INVITE request messages, and one or more SIP response messages, via user interface 564, thereby providing a network-wide view of transmission and receipt of SIP request and response messages. As further shown by user interface 564, the diagram may include an annotation that indicates a fail status (e.g., as shown by solid arrows, rather than dashed arrows, for the SIP ERROR 403 Forbidden response messages). Based on verification of the SIP request-response messages producing a fail result, user interface 564 shows an example of a call flow diagram for request and/or response messages associated with a fail status.

As indicated above, FIGS. 5A-5M are provided merely as an example. Other examples are possible and may differ from what was described with regard to FIGS. 5A-5M.

Implementations described herein enable a server device to automatically verify logic of a request-response protocol used by network devices and to obtain a network-wide view of request messages and response messages sent between the network devices during a communication session. This conserves processing resources, reduces or eliminates labor associated with manually verifying the logic of the request-response protocol, and increases an efficiency of correcting potential errors by enabling identification of failed request messages and/or response messages exchanged between the network devices and identification of a source of the failed request messages and/or response messages.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory; and
   one or more processors to:
      receive a file that includes a log of messages for messages associated with a communication session between multiple devices;
      process the file to permit the device to extract information from the file;
      extract, from the file, information associated with the log of messages, the communication session, or the multiple devices;
      identify a request message from a first device of the multiple devices to a second device of the multiple devices using the information extracted from the file, the request message being associated with a protocol,
         the protocol being a session initiation protocol;

determine whether the second device transmitted a response message corresponding to the request message,
the response message being associated with the protocol;
determine whether the response message is associated with a pass status or a fail status;
receive, from a third device, an input that identifies at least one of:
a parameter associated with the protocol,
a value of the parameter,
an attribute associated with the protocol, or
a value of the attribute;
determine whether the information extracted from the file matches the input; and
provide a report for display based on one or more of determining whether the response message is associated with the pass status or the fail status or determining whether the information extracted from the file matches the input.

2. The device of claim 1, where the one or more processors are further to:
generate the report that includes information identifying a result of:
determining whether the second device transmitted the response message, or
determining whether the response message is associated with the pass status or the fail status; and
where the one or more processors, when providing the report for display, are to:
provide the report to a fourth device for display via a display of the fourth device.

3. The device of claim 1, where the one or more processors are further to:
verify logic of the protocol, the communication session, or the communication session according to the protocol using the information extracted from the file; and
where the one or more processors, when determining whether the response message is associated with the pass status or the fail status, are to:
determine whether the response message is associated with the pass status or the fail status based on verifying the logic of the request message and the response message.

4. The device of claim 1, where the one or more processors are further to:
convert the file from a first file type to a second file type, the first file type and the second file type being different; and
where the one or more processors, when processing the file, are to:
process the file based on converting the file from the first file type to the second file type.

5. The device of claim 1, where the information extracted from the file includes information that identifies:
a source location of the file,
a type of the request message or the response message,
the request message,
the response message,
a type of the communication session,
a call type,
the first device, or
the second device.

6. The device of claim 1, where the file is a packet capture (pcap) file.

7. The device of claim 1, where the one or more processors are further to:
create a comma separated values (CSV) file,
the CSV file including the information, extracted from the file, associated with the log of messages.

8. A non-transitory computer-readable medium storing instructions, the instructions comprising:
one or more instructions that, when executed by one or more processors, cause the one or more processors to:
receive a file that includes a log of messages for messages exchanged among a plurality of network devices,
the messages being associated with a communications protocol,
the communications protocol being a session initiation protocol;
extract information from the file,
the information being associated with the messages,
the information identifying one or more request messages or one or more response messages exchanged among the plurality of network devices;
identify a request message of the one or more request messages,
the request message being transmitted from a first network device of the plurality of network devices to a second network device of the plurality of network devices;
determine whether a response message of the one or more response messages corresponds to the request message;
determine whether the response message is associated with a pass status or a fail status;
receive, from a third network device, an input that identifies at least one of:
a parameter associated with the communications protocol,
a value of the parameter,
an attribute associated with the communications protocol, or
a value of the attribute;
determine whether the information extracted from the file matches the input; and
provide a report for display based on one or more of determining whether the response message is associated with the pass status or the fail status or determining whether the information extracted from the file matches the input.

9. The non-transitory computer-readable medium of claim 8,
where the one or more instructions, that cause the one or more processors to provide the report for display, cause the one or more processors to:
generate the report that identifies whether the response message is associated with the pass status or the fail status and that identifies the first network device and the second network device associated with the request message and the response message; and
provide the report for display via a fourth network device.

10. The non-transitory computer-readable medium of claim 8, where the one or more instructions, when executed by the one or more processors, further cause the one or more processors to:
transmit a message to a network administrator or a vendor based on determining whether the response message is associated with the pass status or the fail status.

11. The non-transitory computer-readable medium of claim 8, where the one or more instructions, when executed by the one or more processors, further cause the one or more processors to:
   determine that the response message is a particular type of response message; and
   where the one or more instructions, that cause the one or more processors to determine whether the response message is associated with the pass status or the fail status, cause the one or more processors to:
      determine whether the response message is associated with the pass status or the fail status based on the response message being the particular type of response message.

12. The non-transitory computer-readable medium of claim 8, where the one or more instructions, when executed by the one or more processors, further cause the one or more processors to:
   determine whether the response message and the request message include matching information; and
   where the one or more instructions, that cause the one or more processors to determine whether the response message corresponds to the request message, cause the one or more processors to:
      determine whether the response message corresponds to the request message based on determining whether the response message and the request message include matching information.

13. The non-transitory computer-readable medium of claim 8, where the one or more instructions, when executed by the one or more processors, further cause the one or more processors to:
   receive information identifying a parameter, a value of the parameter, an attribute, or a value of the attribute to extract from the file; and
   where the one or more instructions, that cause the one or more processors to extract the information, cause the one or more processors to:
      extract the information from the file based on the information identifying the parameter, the value of the parameter, the attribute, or the value of the attribute.

14. The non-transitory computer-readable medium of claim 8, where the one or more instructions, when executed by the one or more processors, further cause the one or more processors to:
   create a comma separated values (CSV) file,
      the CSV file including the information, extracted from the file, associated with the log of messages.

15. A method, comprising:
   receiving, by a device, a file that includes a log of messages for messages communicated among multiple devices during a communication session,
      the messages being associated with a session initiation protocol;
   analyzing, by the device, the file to determine information associated with the messages;
   identifying, by the device, a request message from a first device of the multiple devices to a second device of the multiple devices using the information determined from the file;
   determining, by the device, whether the second device transmitted a response message based on receiving the request message from the first device;
   determining, by the device, whether the response message corresponds to the request message;
   determining, by the device, whether the response message is associated with a pass status or a fail status;
   receive, by the device and from a third device, an input that identifies at least one of:
      a parameter associated with the session initiation protocol,
      a value of the parameter,
      an attribute associated with the session initiation protocol, or
      a value of the attribute;
   determine, by the device, whether the information determined from the file matches the input; and
   provide, by the device, a report for display, based on one or more of determining whether the response message is associated with the pass status or the fail status or determining whether the information determined from the file matches the input.

16. The method of claim 15, where determining whether the response message is associated with the pass status or the fail status comprises:
   determining whether the response message is associated with the pass status or the fail status based on:
      determining whether the second device transmitted the response message based on receiving the request message from the first device, or
      determining whether the response message corresponds to the request message.

17. The method of claim 15, further comprising:
   identifying a type of the response message; and
   where determining whether the response message is associated with the pass status or the fail status comprises:
      determining whether the response message is associated with the pass status or the fail status based on the type of the response message.

18. The method of claim 15, further comprising:
   determining that the second device transmitted the response message, and
   determining that the response message corresponds to the request message; and
   where determining whether the response message is associated with the pass status or the fail status comprises:
      determining that the response message is associated with the pass status based on:
         determining that the second device transmitted the response message, and
         determining that the response message corresponds to the request message.

19. The method of claim 15, further comprising:
   determining that the second device did not transmit the response message, or
   determining that the response message does not correspond to the request message; and
   where determining whether the response message is associated with the pass status or the fail status comprises:
      determining that the response message is associated with the fail status based on:
         determining that the second device did not transmit the response message, or
         determining that the response message does not correspond to the request message.

20. The method of claim 15, further comprising:
   transmitting a command to the first device or the second device to cause the first device or the second device to fix a cause associated with the fail status.

* * * * *